(12) United States Patent
Teng et al.

(10) Patent No.: US 11,588,731 B1
(45) Date of Patent: Feb. 21, 2023

(54) CLOUD-TO-CLOUD INTERFACE

(71) Applicant: Equinix, Inc., Redwood City, CA (US)

(72) Inventors: Juxiang Teng, Walnut Creek, CA (US); Imam Sheikh, Redwood City, CA (US); Muhammad Durrani, San Jose, CA (US)

(73) Assignee: EQUINIX, INC., Redwood City, CA (US)

(*) Notice: Subject to any disclaimer, the term of this patent is extended or adjusted under 35 U.S.C. 154(b) by 0 days.

(21) Appl. No.: 17/139,606

(22) Filed: Dec. 31, 2020

Related U.S. Application Data

(60) Provisional application No. 62/962,659, filed on Jan. 17, 2020.

(51) Int. Cl.
*H04L 45/586* (2022.01)
*H04L 45/00* (2022.01)
*H04L 61/2521* (2022.01)
*H04L 45/302* (2022.01)
*H04L 45/24* (2022.01)

(52) U.S. Cl.
CPC ............ *H04L 45/586* (2013.01); *H04L 45/24* (2013.01); *H04L 45/3065* (2013.01); *H04L 45/40* (2013.01); *H04L 61/2521* (2013.01)

(58) Field of Classification Search
CPC ... H04L 45/586; H04L 45/24; H04L 45/3065; H04L 45/40; H04L 61/2521
See application file for complete search history.

(56) References Cited

U.S. PATENT DOCUMENTS

| | | |
|---|---|---|
| 9,787,559 B1 | 10/2017 | Schroeder |
| 9,886,267 B2 | 2/2018 | Maheshwari et al. |
| 9,948,552 B2 | 4/2018 | Teng et al. |
| 10,129,078 B2 | 11/2018 | Kumar et al. |
| 10,355,989 B1 | 7/2019 | Panchal et al. |
| 10,708,125 B1 * | 7/2020 | Chen .................. H04L 65/1046 |
| 10,742,721 B1 | 8/2020 | Wagner et al. |
| 10,819,630 B1 | 10/2020 | Panchal et al. |
| 10,878,483 B1 | 12/2020 | Felbinger et al. |
| 2008/0205410 A1 | 8/2008 | Raut |

(Continued)

OTHER PUBLICATIONS

Rosen et al., "BGP/MPLS IP Virtual Private Networks (VPNs)," RFC 4364, Network Working Group, The Internet Society, Feb. 2006, 48 pp.

(Continued)

*Primary Examiner* — Yaotang Wang
(74) *Attorney, Agent, or Firm* — Shumaker & Sieffert, P.A.

(57) ABSTRACT

In general, this disclosure describes a cloud exchange (or "cloud exchange") that offers a cloud-to-cloud interface (CCI) for interconnecting cloud services to tenants within public clouds. As described herein, the cloud exchange may be configured with a cloud-to-cloud interface that enables tenant applications of a public cloud to subscribe to and communicate with cloud services, using an end-to-end layer 3 path, in some cases without requiring a separate routing protocol session with a public edge device for the public cloud. In some examples, the public cloud provides a virtual layer 2 connection from a tenant within a public cloud to a routing instance of the cloud exchange, and the cloud exchange uses the routing instance to route service traffic between the tenant and the cloud services.

20 Claims, 14 Drawing Sheets

(56) References Cited

U.S. PATENT DOCUMENTS

| | | | |
|---|---|---|---|
| 2010/0080235 A1 | 4/2010 | Yamate et al. | |
| 2013/0142201 A1* | 6/2013 | Kim | H04L 12/4645 |
| | | | 370/392 |
| 2013/0268588 A1 | 10/2013 | Chang et al. | |
| 2013/0283364 A1* | 10/2013 | Chang | G06F 9/45558 |
| | | | 726/12 |
| 2013/0332602 A1 | 12/2013 | Nakil et al. | |
| 2015/0134485 A1 | 5/2015 | Kim et al. | |
| 2015/0295731 A1 | 10/2015 | Bagepalli et al. | |
| 2016/0072727 A1 | 3/2016 | Leafe et al. | |
| 2016/0080502 A1 | 3/2016 | Yadav et al. | |
| 2016/0088092 A1 | 3/2016 | Cardona-Gonzalez et al. | |
| 2016/0094328 A1 | 3/2016 | Wang et al. | |
| 2016/0127254 A1 | 5/2016 | Kumar et al. | |
| 2016/0127454 A1 | 5/2016 | Maheshwari et al. | |
| 2016/0134520 A1 | 5/2016 | Kapadia et al. | |
| 2016/0182378 A1 | 6/2016 | Basavaraja et al. | |
| 2016/0182380 A1 | 6/2016 | Mehra et al. | |
| 2016/0197835 A1* | 7/2016 | Luft | H04L 67/28 |
| | | | 709/223 |
| 2016/0218918 A1 | 7/2016 | Chu | |
| 2016/0261564 A1 | 9/2016 | Foxhoven et al. | |
| 2016/0308762 A1* | 10/2016 | Teng | H04L 61/256 |
| 2016/0337474 A1 | 11/2016 | Rao et al. | |
| 2016/0344628 A1 | 11/2016 | Hocker et al. | |
| 2016/0373474 A1 | 12/2016 | Sood et al. | |
| 2017/0104755 A1* | 4/2017 | Arregoces | H04L 63/102 |
| 2018/0091395 A1 | 3/2018 | Shinohara | |
| 2018/0115485 A1 | 4/2018 | Chiba | |
| 2020/0099659 A1* | 3/2020 | Cometto | H04L 63/0263 |
| 2020/0204622 A1* | 6/2020 | Thyagarajan | G06F 9/45558 |

OTHER PUBLICATIONS

Rekhter et al., "Address Allocation for Private Internets," RFC 1918, Network Working Group, Feb. 1996, 9 pp.

"ECX Fabric," Equinix, retrieved Apr. 22, 2021 from: https://web.archive.org/web/20201018012535/https://docs.equinix.com/enus/Content/Interconnection/ECXF/landing-pages/ECXF-landing-main.htm, Oct. 18, 2020, 1 pp.

"What is Azure Express Route?," Microsoft, Retrieved Apr. 22, 2021 from: https://docs.microsoft.com/en-us/azure/expressroute/expressroute-introduction, Oct. 5, 2020, 6 pp.

U.S. Appl. No. 17/080,418, filed Oct. 26, 2020, naming inventors Panchal et al.

* cited by examiner

CLOUD-TO-CLOUD INTERFACE

CROSS REFERENCE

This application claims the benefit of U.S. Provisional Application No. 62/962,659 filed Jan. 17, 2020; the entire content of which is hereby incorporated by reference.

TECHNICAL FIELD

The disclosure relates to computer networks and, more specifically, to connections among cloud service customer tenants and cloud service providers.

BACKGROUND

Cloud computing refers to the use of dynamically scalable computing resources accessible via a network, such as the Internet. The computing resources, often referred to as a "cloud," provide one or more services to users. These services may be categorized according to service types, which may include for examples, applications/software, platforms, infrastructure, virtualization, and servers and data storage. The names of service types are often prepended to the phrase "as-a-Service" such that the delivery of applications/software and infrastructure, as examples, may be referred to as Software-as-a-Service (SaaS), Platform-as-a-Service (PaaS), and Infrastructure-as-a-Service (IaaS), respectively.

The term "cloud-based services" or, more simply, "cloud services" refers not only to services provided by a cloud, but also to a form of service provisioning in which cloud customers contract with cloud service providers for the online delivery of services provided by the cloud. Cloud service providers manage a public, private, or hybrid cloud to facilitate the online delivery of cloud services to one or more cloud customers.

SUMMARY

In general, this disclosure describes a cloud exchange (or "cloud exchange") that offers a cloud-to-cloud interface (CCI) for interconnecting cloud services to tenants within public clouds. The public clouds may offer Platform-as-a-Service (PaaS), Software-as-a-Service (SaaS), Infrastructure-as-a-Service (IaaS), or Security-as-a-Service (SECaaS) (e.g., Distributed Denial of Service (DDoS)-Mitigation-as-a-Service (DDoSMaaS)) to tenants that use the public clouds to execute applications requiring access to SaaS cloud services accessible via the cloud exchange. As described herein, the cloud exchange may be configured with a cloud-to-cloud interface that enables tenant applications of a public cloud to subscribe to and communicate with cloud services, using an end-to-end layer 3 path, in some cases without requiring a separate routing protocol session with a public edge device for the public cloud. In some examples, the public cloud provides a virtual layer 2 connection from a tenant within a public cloud to a routing instance of the cloud exchange, and the cloud exchange uses the routing instance to route service traffic between the tenant and the cloud services.

The techniques may provide one or more technical advantages that enable at least one practical application. For example, the techniques enable a cloud exchange to provide private, high-performance connections between cloud service customer tenants with cloud service providers to facilitate direct access to the services with which the cloud service customer can build sophisticated cloud solutions. That is, a cloud exchange may apply one or more of the techniques to support non-colocation customers in cloud exchange support systems by bundling with the cloud service partner (e.g., PaaS or Iaas) CCI reference point. In this way, cloud traffic between a customer tenant and a cloud service provider may bypass the Internet, which may improve performance and prevent Internet-based intrusions and other attacks on a customer tenant network, such as denial-of-service (DoS) attacks. Further, by consolidating connections between multiple cloud providers and cloud customers, the cloud exchange described herein may promote multi-edge computing and facilitating new market services within the cloud services community. Multi-edge computing, for instance, utilizes globally distributed data center infrastructure in multiple metropolitan areas each having one or more data centers for supporting services, leading to lower-latencies and improved customer experience for cloud services and other services.

In one example, a cloud exchange comprises a network configured with a first cloud customer virtual routing and forwarding instance (VRF) and a first cloud service provider (CSP) VRF. The cloud exchange further comprises a first cloud-to-cloud interface comprising a layer 2 connection between the network and a router of a first tenant of a public cloud, wherein the network is configured to use the first cloud-to-cloud interface to exchange, via a first customer peering session, first route information with the router of the first tenant of the public cloud, wherein the network is configured to use the first CSP VRF to exchange, via a first CSP peering session, second route information with a first CSP, wherein the network is configured to exchange the first route information and the second route information between the first cloud customer VRF and the first CSP VRF, and wherein the network receives, from the first tenant of the public cloud, service traffic for the first CSP and forwards, using the first cloud customer VRF and the first CSP VRF, the service traffic to the first CSP based on at least one of the first route information or the second route information.

In one example, a method comprises configuring a network with a first cloud customer virtual routing and forwarding instance (VRF) and a first cloud service provider (CSP) VRF to exchange, via a first CSP peering session, second route information with a first CSP VRF, and to exchange first route information and the second route information with the first cloud customer VRF; configuring a first cloud-to-cloud interface including a layer 2 connection between the network and a router of a first tenant of a public cloud; configuring the network to use the first cloud-to-cloud interface to exchange, via a first customer peering session, first route information with the router of the first tenant of the public cloud; configuring the network to exchange the first route information and the second route information between the first cloud customer VRF and the first CSP VRF; receiving, at the network, service traffic from the first tenant of the public cloud for the first CSP; and forwarding, by the network using the first cloud customer VRF and the first CSP VRF, the service traffic to the first CSP based on at least one of the first route information or the second route information.

In one example, a computer readable storage medium comprises instructions that when executed cause one or more processors to configure a network with a first cloud customer virtual routing and forwarding instance (VRF) and a first cloud service provider (CSP) VRF to exchange, via a first CSP peering session, second route information with a first CSP VRF, and to exchange first route information and the second route information with the first cloud customer VRF. The instructions further cause the one or more processors to configure a first cloud-to-cloud interface including a layer 2 connection between the network and a router of a first tenant of a public cloud; configure the network to use the cloud-to-cloud interface to exchange, via a first customer peering session, first route information with the router of the first tenant of the public cloud; receive, at the network, service traffic from the first tenant of the public cloud for the first CSP; and forward, by the network, using the first cloud customer VRF and the first CSP VRF, the service traffic to the first CSP based on at least one of the first route information or the second route information.

The details of one or more examples are set forth in the accompanying drawings and the description below. Other features, objects, and advantages will be apparent from the description and drawings, and from the claims.

BRIEF DESCRIPTION OF DRAWINGS

Like reference characters denote like elements throughout the figures and text.

DETAILED DESCRIPTION

Figure 1:
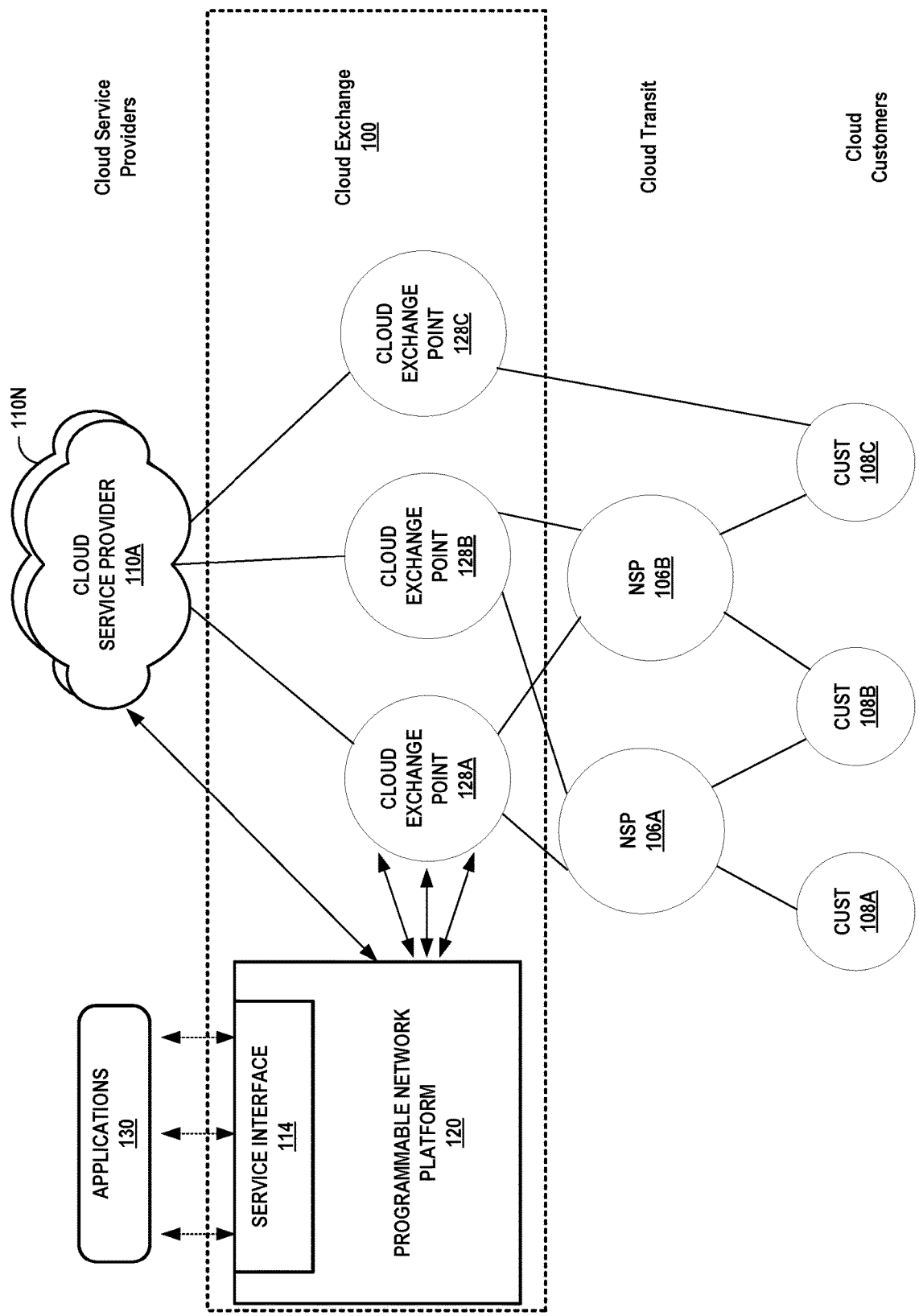
FIG. 1 is a block diagram that illustrates a conceptual view of a network system having a metro-based cloud exchange that provides multiple cloud exchange points according to techniques described herein.

FIG. 1 illustrates a conceptual view of a network system having a metro-based cloud exchange that provides multiple cloud exchange points according to techniques described herein. Each of cloud-based services exchange points 128A-128D (described hereinafter as "cloud exchange points" and collectively referred to as "cloud exchange points 128") of cloud-based services exchange 100 ("cloud exchange 100") may represent a different data center geographically located within the same metropolitan area ("metro-based," e.g., in New York City, N.Y.; Silicon Valley, Calif.; Seattle-Tacoma, Wash.; Minneapolis-St. Paul, Minn.; London, United Kingdom; etc.) to provide resilient and independent cloud-based services exchange by which cloud-based services customers ("cloud customers") and cloud-based service providers ("cloud providers") connect to receive and provide, respectively, cloud services. In various examples, cloud exchange 100 may include more or fewer cloud exchange points 128. In some instances, a cloud exchange 100 includes just one cloud exchange point 128. As used herein, reference to a "cloud exchange" or "cloud-based services exchange" may refer to a cloud exchange point. A cloud exchange provider may deploy instances of cloud exchanges 100 in multiple different metropolitan areas, each instance of cloud exchange 100 having one or more cloud exchange points 128.

Each of cloud exchange points 128 includes network infrastructure and an operating environment by which cloud customers 108A-108D (collectively, "cloud customers 108") receive cloud services from multiple cloud service providers 110A-110N (collectively, "cloud service providers 110"). Cloud exchange 100 provides customers of the exchange, e.g., enterprises, network carriers, network service providers, and SaaS customers, with secure, private, virtual connections to multiple cloud service providers (CSPs) globally. The multiple CSPs participate in the cloud exchange by virtue of their having at least one accessible port in the cloud exchange by which a customer can connect to the one or more cloud services offered by the CSPs, respectively. Cloud exchange 100 allows private networks of any customer to be directly cross-connected to any other customer at a common point, thereby allowing direct exchange of network traffic between the networks of the customers.

Cloud customers 108 may receive cloud-based services directly via a layer 3 peering and physical connection to one of cloud exchange points 128 or indirectly via one of network service providers 106A-106B (collectively, "NSPs 106," or alternatively, "carriers 106"). NSPs 106 provide "cloud transit" by maintaining a physical presence within one or more of cloud exchange points 128 and aggregating layer 3 access from one or customers 108. NSPs 106 may peer, at layer 3, directly with one or more cloud exchange points 128 and in so doing offer indirect layer 3 connectivity and peering to one or more customers 108 by which customers 108 may obtain cloud services from the cloud exchange 100. Each of cloud exchange points 128, in the example of FIG. 1, is assigned a different autonomous system number (ASN). For example, cloud exchange point 128A is assigned ASN 1, cloud exchange point 128B is assigned ASN 2, and so forth. Each cloud exchange point 128 is thus a next hop in a path vector routing protocol (e.g., BGP) path from cloud service providers 110 to customers 108. As a result, each cloud exchange point 128 may, despite not being a transit network having one or more wide area network links and concomitant Internet access and transit policies, peer with multiple different autonomous systems via external BGP (eBGP) or other exterior gateway routing protocol in order to exchange, aggregate, and route service traffic from one or more cloud service providers 110 to customers. In other words, cloud exchange points 128 may internalize the eBGP peering relationships that cloud service providers 110 and customers 108 would maintain on a pair-wise basis. Instead, a customer 108 may configure a single eBGP peering relationship with a cloud exchange point 128 and receive, via the cloud exchange, multiple cloud services from one or more cloud service providers 110. While described herein primarily with respect to eBGP or other layer 3 routing protocol peering between cloud exchange points and customer, NSP, or cloud service provider networks, the cloud exchange points may learn routes from these networks in other ways, such as by static configuration, or via Routing Information Protocol (RIP), Open Shortest Path First (OSPF), Intermediate System-to-Intermediate System (IS-IS), or other route distribution protocol.

As examples of the above, customer 108C is illustrated as having contracted with a cloud exchange provider for cloud exchange 100 to directly access layer 3 cloud services via cloud exchange points 128C and also to have contracted with NSP 106B to access layer 3 cloud services via a transit network of the NSP 106B. In this way, customer 108C receives redundant layer 3 connectivity to cloud service provider 110A, for instance. Customer 108B is illustrated as having contracted with multiple NSPs 106A, 106B to have redundant cloud access to cloud exchange points 128A, 128B via respective transit networks of the NSPs 106A, 106B. The contracts described above are instantiated in network infrastructure of the cloud exchange points 128 by L3 peering configurations within switching devices of NSPs 106 and cloud exchange points 128 and L3 connections, e.g., layer 3 virtual circuits, established within cloud exchange points 128 to interconnect cloud service provider 110 networks to NSPs 106 networks and customer 108 networks, all having at least one port offering connectivity within one or more of the cloud exchange points 128.

In some examples, cloud exchange 100 allows a corresponding one of customer customers 108A, 108B of any network service providers (NSPs) or "carriers" 106A-106B (collectively, "carriers 106") or other cloud customers including customers 108C to be directly connected, via a virtual layer 2 (L2) or layer 3 (L3) connection to any other customer network and/or to any of CSPs 110, thereby allowing direct exchange of network traffic among the customer networks and CSPs 110. The virtual L2 or L3 connection may be referred to as a "virtual circuit."

Carriers 106 may each represent a network service provider that is associated with a transit network by which network subscribers of the carrier 106 may access cloud services offered by CSPs 110 via the cloud exchange 100. In general, customers of CSPs 110 may include network carriers, large enterprises, managed service providers (MSPs), as well as Software-as-a-Service (SaaS), Platform-aaS (PaaS), Infrastructure-aaS (IaaS), Virtualization-aaS (VaaS), and data Storage-aaS (dSaaS) customers for such cloud-based services as are offered by the CSPs 110 via the cloud exchange 100.

In this way, cloud exchange 100 streamlines and simplifies the process of partnering CSPs 110 and customers (via carriers 106 or directly) in a transparent and neutral manner. One example application of cloud exchange 100 is a co-location and interconnection data center in which CSPs 110 and carriers 106 and/or customers 108 may already have network presence, such as by having one or more accessible ports available for interconnection within the data center, which may represent any of cloud exchange points 128. This allows the participating carriers, customers, and CSPs to have a wide range of interconnectivity options within the same facility. A carrier/customer may in this way have options to create many-to-many interconnections with only a one-time hook up to one or more cloud exchange points 128. In other words, instead of having to establish separate connections across transit networks to access different cloud service providers or different cloud services of one or more cloud service providers, cloud exchange 100 allows customers to interconnect to multiple CSPs and cloud services.

Cloud exchange 100 includes a programmable network platform 120 for dynamically programming cloud exchange 100 to responsively and assuredly fulfill service requests that encapsulate business requirements for services provided by cloud exchange 100 and/or cloud service providers 110 coupled to the cloud exchange 100. The programmable network platform 120 may, as a result, orchestrate a business-level service across heterogeneous cloud service providers 110 according to well-defined service policies, quality of service policies, service level agreements, and costs, and further according to a service topology for the business-level service.

The programmable network platform 120 enables the cloud service provider that administers the cloud exchange 100 to dynamically configure and manage the cloud exchange 100 to, for instance, facilitate virtual connections for cloud-based services delivery from multiple cloud service providers 110 to one or more cloud customers 108. The cloud exchange 100 may enable cloud customers 108 to bypass the public Internet to directly connect to cloud services providers 110 so as to improve performance, reduce costs, increase the security and privacy of the connections, and leverage cloud computing for additional applications. In this way, enterprises, network carriers, and SaaS customers, for instance, can at least in some aspects integrate cloud services with their internal applications as if such services are part of or otherwise directly coupled to their own data center network.

In other examples, programmable network platform 120 enables the cloud service provider to configure cloud exchange 100 with a L3 instance requested by a cloud customer 108, as described herein. A customer 108 may request an L3 instance to link multiple cloud service providers by the L3 instance, for example (e.g., for transferring the customer's data between two cloud service providers, or for obtaining a mesh of services from multiple cloud service providers).

Programmable network platform 120 may represent an application executing within one or more data centers of the cloud exchange 100 or alternatively, off-site at a back office or branch of the cloud provider (for instance). Programmable network platform 120 may be distributed in whole or in part among the data centers, each data center associated with a different cloud exchange point 128 to make up the cloud exchange 100. Although shown as administering a single cloud exchange 100, programmable network platform 120 may control service provisioning for multiple different cloud exchanges. Alternatively or additionally, multiple separate instances of the programmable network platform 120 may control service provisioning for respective multiple different cloud exchanges.

In the illustrated example, programmable network platform 120 includes a service interface (or "service API") 114 that defines the methods, fields, and/or other software primitives by which applications 130, such as a customer portal, may invoke the programmable network platform 120. The service interface 114 may allow carriers 106, customers 108, cloud service providers 110, and/or the cloud exchange provider programmable access to capabilities and assets of the cloud exchange 100 according to techniques described herein.

For example, the service interface 114 may facilitate machine-to-machine communication to enable dynamic provisioning of virtual circuits in the cloud exchange for interconnecting customer and/or cloud service provider networks. In this way, the programmable network platform 120 enables the automation of aspects of cloud services provisioning. For example, the service interface 114 may provide an automated and seamless way for customers to establish, de-install and manage interconnections among multiple, different cloud providers participating in the cloud exchange.

Further example details of a cloud-based services exchange can be found in U.S. patent application Ser. No. 15/099,407, filed Apr. 14, 2016 and entitled "CLOUD-BASED SERVICES EXCHANGE;" U.S. patent application Ser. No. 14/927,451, filed Oct. 29, 2015 and entitled "INTERCONNECTION PLATFORM FOR REAL-TIME CONFIGURATION AND MANAGEMENT OF A CLOUD-BASED SERVICES EXCHANGE;" and U.S. patent application Ser. No. 14/927,306, filed Oct. 29, 2015 and entitled "ORCHESTRATION ENGINE FOR REAL-TIME CONFIGURATION AND MANAGEMENT OF INTERCONNECTIONS WITHIN A CLOUD-BASED SERVICES EXCHANGE;" each of which are incorporated herein by reference in their respective entireties.

Cloud service providers 110 may host, as tenants, one or more customers of the cloud exchange provider for cloud exchange 100. In accordance with techniques described in this disclosure, cloud exchange 100 offers a cloud-to-cloud interface (CCI) for interconnecting cloud services to tenants within any of cloud service providers 110. Cloud service providers may offer Platform-as-a-Service (PaaS), Software-as-a-Service (SaaS), Infrastructure-as-a-Service (IaaS), or Security-as-a-Service (SECaaS) (e.g., Distributed Denial of Service (DDoS) Mitigation-as-a-Service (DDoSMaaS)) to tenants that use the cloud service provider 110 networks to execute applications requiring access to SaaS or other cloud services accessible via cloud exchange 100. As described herein, cloud exchange 100 may be configured with a cloud-to-cloud interface that enables tenant applications of cloud service providers 110 to subscribe to and communicate with cloud services, using an end-to-end layer 3 path, in some cases without requiring a separate routing protocol session with a public edge device for a cloud service provider 110 network. In some examples, the cloud service provider 110 network may provide a virtual layer 2 connection from a tenant within cloud service provider 110 network to a routing instance of cloud exchange 100, and cloud exchange 100 uses the routing instance to route service traffic between the tenant and the cloud services.

Figure 2:
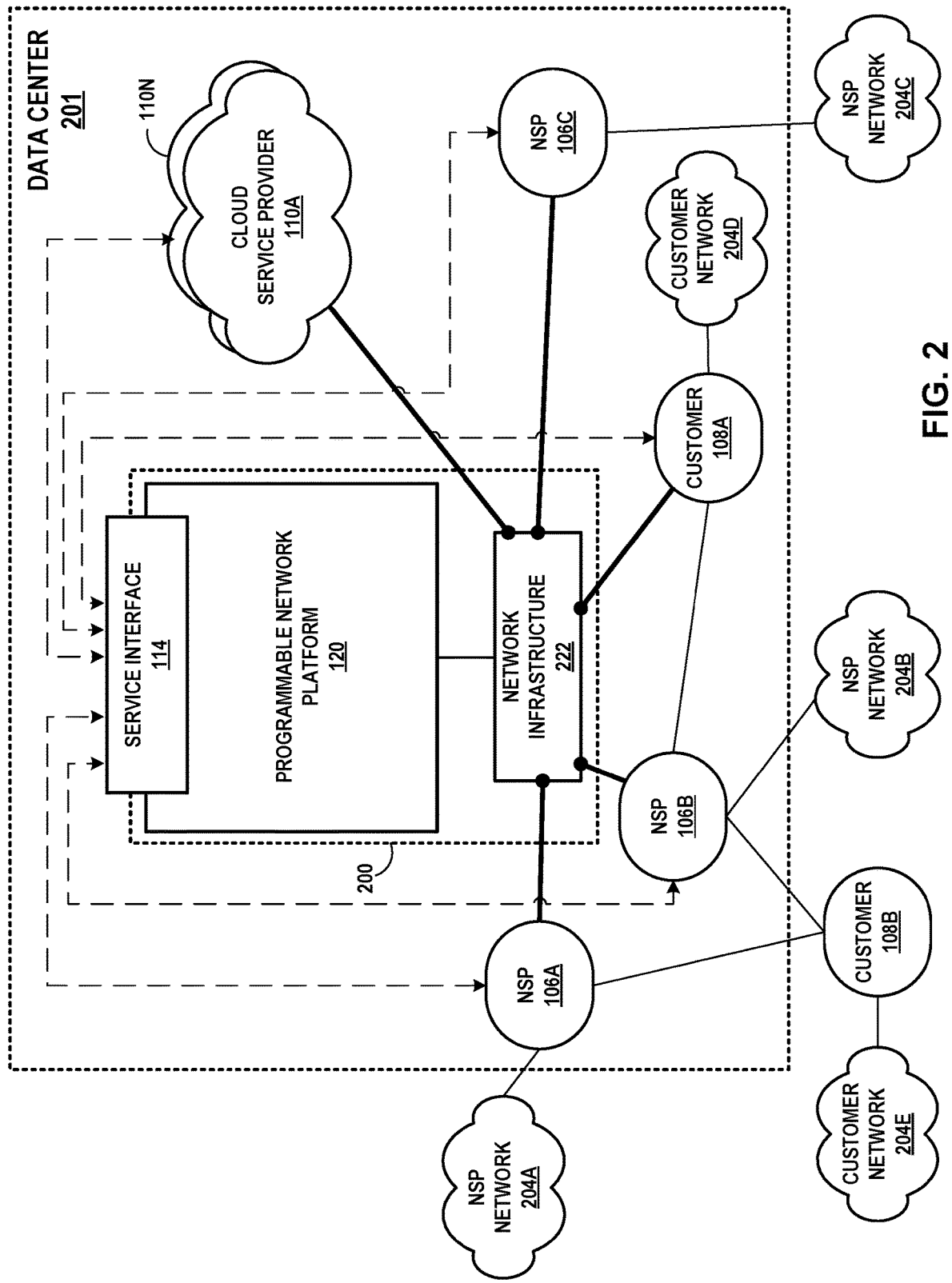
FIG. 2 is a block diagram illustrating a high-level view of a data center that provides an operating environment for a cloud-based services exchange, according to techniques described herein.

FIG. 2 is a block diagram illustrating a high-level view of a data center 201 that provides an operating environment for a cloud-based services exchange 200, according to techniques described herein. Cloud-based services exchange 200 ("cloud exchange 200") allows a corresponding one of customer networks 204D, 204E and NSP networks 204A-204C (collectively, "'private' or 'carrier' networks 204") of any NSPs 106A-106C or other cloud customers including customers 108A, 108B to be directly connected, via a layer 3 (L3) or layer 2 (L2) connection to any other customer network and/or to any of cloud service providers 110A-110N, thereby allowing exchange of cloud service traffic among the customer networks and/or CSPs 110. Data center 201 may be entirely located within a centralized area, such as a warehouse or localized data center complex, and provide power, cabling, security, and other services to NSPs, customers, and cloud service providers that locate their respective networks within the data center 201 (e.g., for co-location) and/or connect to the data center 201 by one or more external links.

Network service providers 106 may each represent a network service provider that is associated with a transit network by which network subscribers of the NSP 106 may access cloud services offered by CSPs 110 via the cloud exchange 200. In general, customers of CSPs 110 may include network carriers, large enterprises, managed service providers (MSPs), as well as Software-as-a-Service (SaaS), Platform-aaS (PaaS), Infrastructure-aaS (IaaS), Virtualization-aaS (VaaS), and data Storage-aaS (dSaaS) customers for such cloud-based services as are offered by the CSPs 110 via the cloud exchange 200.

In this way, cloud exchange 200 streamlines and simplifies the process of partnering CSPs 110 and customers 108 (indirectly via NSPs 106 or directly) in a transparent and neutral manner. One example application of cloud exchange 200 is a co-location and interconnection data center in which CSPs 110, NSPs 106 and/or customers 108 may already have network presence, such as by having one or more accessible ports available for interconnection within the data center. This allows the participating carriers, customers, and CSPs to have a wide range of interconnectivity options in the same facility.

Cloud exchange 200 of data center 201 includes network infrastructure 222 that provides a L2/L3 switching fabric by which CSPs 110 and customers/NSPs interconnect. This enables an NSP/customer to have options to create many-to-many interconnections with only a one-time hook up to the switching network and underlying network infrastructure 222 that presents an interconnection platform for cloud exchange 200. In other words, instead of having to establish separate connections across transit networks to access different cloud service providers or different cloud services of one or more cloud service providers, cloud exchange 200 allows customers to interconnect to multiple CSPs and cloud services using network infrastructure 222 within data center 201, which may represent any of the edge networks described in this disclosure, at least in part.

By using cloud exchange 200, customers can purchase services and reach out to many end users in many different geographical areas without incurring the same expenses typically associated with installing and maintaining multiple virtual connections with multiple CSPs 110. For example, NSP 106A can expand its services using network 204B of NSP 106B. By connecting to cloud exchange 200, an NSP 106 may be able to generate additional revenue by offering to sell its network services to the other carriers. For example, NSP 106C can offer the opportunity to use NSP network 204C to the other NSPs.

Cloud exchange 200 includes an programmable network platform 120 that exposes at least one service interface, which may include in some examples and are alternatively referred to herein as application programming interfaces (APIs) in that the APIs define the methods, fields, and/or other software primitives by which applications may invoke the programmable network platform 120. The software interfaces allow NSPs 206 and customers 108 programmable access to capabilities and assets of the cloud exchange 200. The programmable network platform 120 may alternatively be referred to as a controller, provisioning platform, provisioning system, service orchestration system, etc., for establishing end-to-end services including, e.g., connectivity between customers and cloud service providers according to techniques described herein.

On the buyer side, the software interfaces presented by the underlying interconnect platform provide an extensible framework that allows software developers associated with the customers of cloud exchange 200 (e.g., customers 108 and NSPs 204) to create software applications that allow and leverage access to the programmable network platform 120 by which the applications may request that the cloud exchange 200 establish connectivity between the customer and cloud services offered by any of the CSPs 110. For example, these buyer-side software interfaces may allow customer applications for NSPs and enterprise customers, e.g., to obtain authorization to access the cloud exchange, obtain information regarding available cloud services, obtain active ports and metro area details for the customer, create virtual circuits of varying bandwidth to access cloud services, including dynamic selection of bandwidth based on a purchased cloud service to create on-demand and need based virtual circuits to or between cloud service providers, delete virtual circuits, obtain active virtual circuit information, obtain details surrounding CSPs partnered with the cloud exchange provider, obtain customized analytics data, validate partner access to interconnection assets, and assure service delivery.

On the cloud service provider seller side, the software interfaces may allow software developers associated with cloud providers to manage their cloud services and to enable customers to connect to their cloud services. For example, these seller-side software interfaces may allow cloud service provider applications to obtain authorization to access the cloud exchange, obtain information regarding available cloud services, obtain active ports and metro area details for the provider, obtain active port details in a given data center for the provider, approve or reject virtual circuits of varying bandwidth created by customers for the purpose of accessing cloud services, obtain virtual circuits pending addition and confirm addition of virtual circuits, obtain virtual circuits pending deletion and confirm deletion of virtual circuits, obtain customized analytics data, validate partner access to interconnection assets, and assure service delivery.

Service interface 114 facilitates machine-to-machine communication to enable dynamic service provisioning and service delivery assurance. In this way, the programmable network platform 120 enables the automation of aspects of cloud services provisioning. For example, the software interfaces may provide an automated and seamless way for customers to establish, de-install and manage interconnection with or between multiple, different cloud providers participating in the cloud exchange. The programmable network platform 120 may in various examples execute on one or virtual machines and/or real servers of data center 201, or off-site.

In the example of FIG. 2, network infrastructure 222 represents the cloud exchange switching fabric and includes multiple ports that may be dynamically interconnected with virtual circuits by, e.g., invoking service interface 114 of the programmable network platform 120. Each of the ports is associated with one of carriers 106, customers 108, and CSPs 110.

In some examples, a cloud exchange seller (e.g., an enterprise or a CSP nested in a CSP) may request and obtain an L3 instance, and may then create a seller profile associated with the L3 instance, and subsequently operate as a seller on the cloud exchange. The techniques of this disclosure enable multiple CSPs to participate in an Enterprise's L3 instance (e.g., an L3 "routed instance" or L2 "bridged instance") without each CSP flow being anchored with an enterprise device.

Cloud service providers 110 may host, as tenants, one or more customers of the cloud exchange provider for cloud exchange 100. In accordance with techniques described in this disclosure, cloud exchange 100 offers a cloud-to-cloud interface (CCI) for interconnecting cloud services to tenants within any of cloud service providers 110. Cloud service providers may offer Platform-as-a-Service (PaaS), Software-as-a-Service (SaaS), Infrastructure-as-a-Service (IaaS), or Security-as-a-Service (SECaaS) (e.g., Distributed Denial of Service (DDoS) Mitigation-as-a-Service (DDoSMaaS)) to tenants that use the cloud service provider 110 networks to execute applications requiring access to SaaS or other cloud services accessible via cloud exchange 100. As described herein, cloud exchange 100 may be configured with a cloud-to-cloud interface that enables tenant applications of cloud service providers 110 to subscribe to and communicate with cloud services, using an end-to-end layer 3 path, in some cases without requiring a separate routing protocol session with a public edge device for a cloud service provider 110 network. In some examples, the cloud service provider 110 network may provide a virtual layer 2 connection from a tenant within cloud service provider 110 network to a routing instance of cloud exchange 100, and cloud exchange 100 uses the routing instance to route service traffic between the tenant and the cloud services. Cloud services may be offered by cloud service provider 110 networks.

Figure 3A:
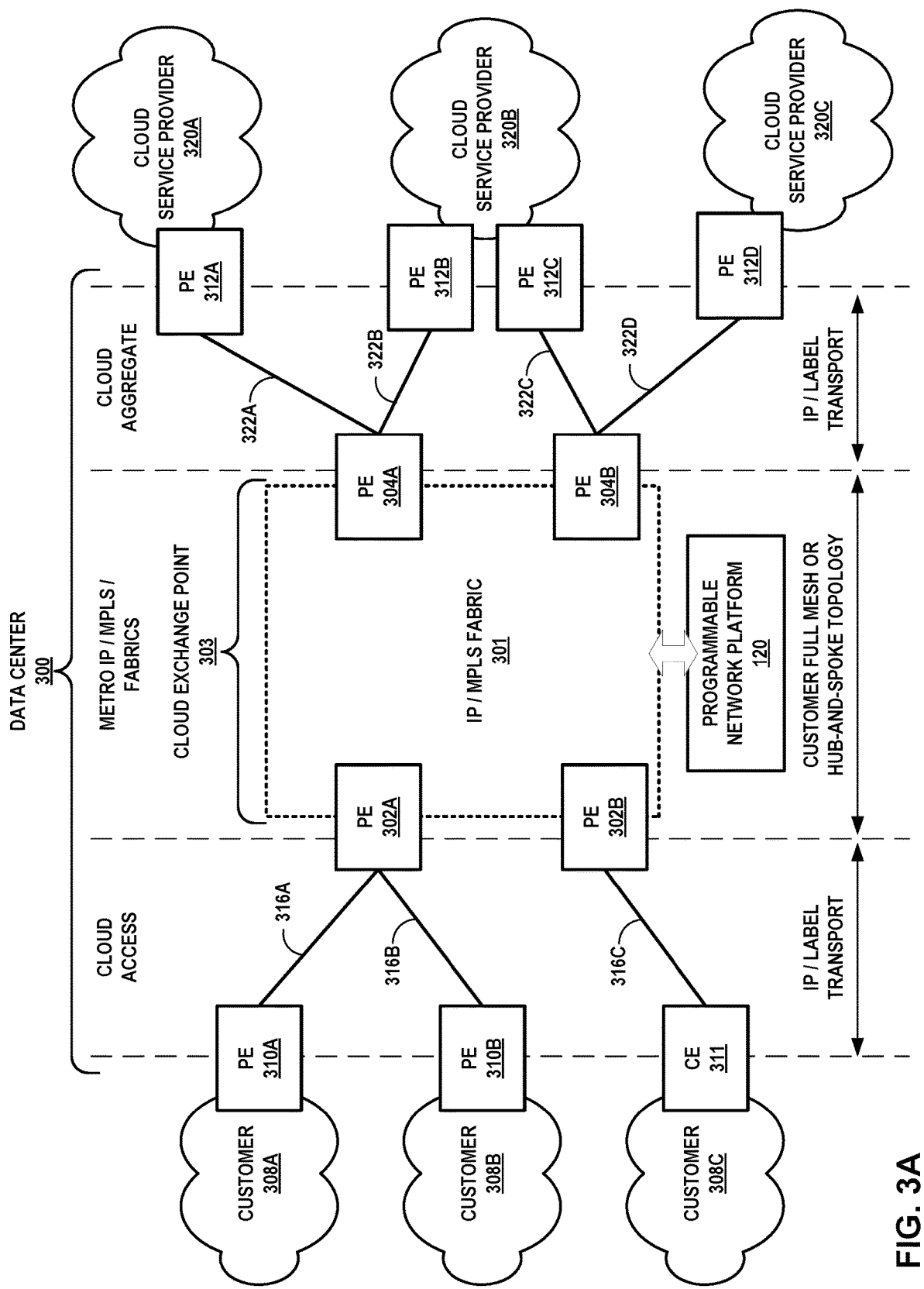
FIGS. 3A-3B are block diagrams illustrating example network infrastructure and service provisioning by a programmable network platform and subscription based service for a cloud exchange that aggregates the cloud services of multiple cloud service providers for provisioning to customers of the cloud exchange provider and aggregates access for multiple customers to one or more cloud service providers, in accordance with techniques described in this disclosure.
Figure 3B:
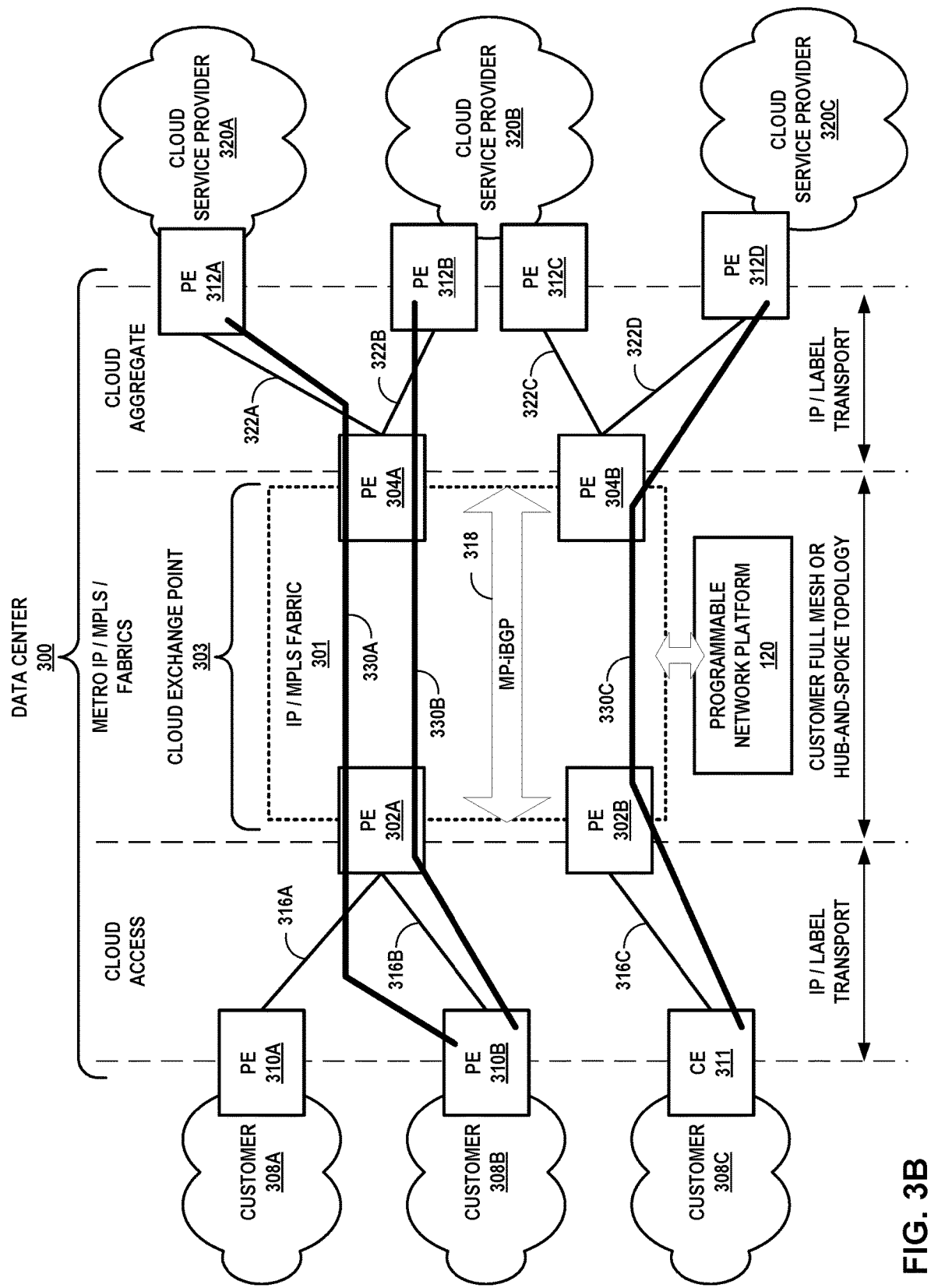

FIGS. 3A-3B are block diagrams illustrating example network infrastructure and service provisioning by a programmable network platform and subscription based service for a cloud exchange that aggregates the cloud services of multiple cloud service providers for provisioning to customers of the cloud exchange provider and aggregates access for multiple customers to one or more cloud service providers, in accordance with techniques described in this disclosure. In this example, customer networks 308A-308C (collectively, "customer networks 308"), each associated with a different customer, access a cloud exchange point within a data center 300 in order to receive aggregated cloud services from one or more cloud service provider networks 320, each associated with a different cloud service provider 110. In some examples, customer networks 308 each include endpoint devices that consume cloud services provided by cloud service provider network 320. Example endpoint devices include servers, smart phones, television set-top boxes, workstations, laptop/tablet computers, video gaming systems, teleconferencing systems, media players, and so forth.

Customer networks 308A-308B include respective provider edge/autonomous system border routers (PE/ASBRs) 310A-310B. Each of PE/ASBRs 310A, 310B may execute exterior gateway routing protocols to peer with one of PE routers 302A-302B ("PE routers 302" or more simply "PEs 302") over one of access links 316A-316B (collectively, "access links 316"). In the illustrated examples, each of access links 316 represents a transit link between an edge router of a customer network 308 and an edge router (or autonomous system border router) of cloud exchange point 303. For example, PE 310A and PE 302A may directly peer via an exterior gateway protocol, e.g., exterior BGP, to exchange L3 routes over access link 316A and to exchange L3 data traffic between customer network 308A and cloud service provider networks 320. Access links 316 may in some cases represent and alternatively be referred to as attachment circuits for IP-VPNs configured in IP/MPLS fabric 301, as described in further detail below. Access links 316 may in some cases each include a direct physical connection between at least one port of a customer network 308 and at least one port of cloud exchange point 303, with no intervening transit network. Access links 316 may operate over a VLAN or a stacked VLAN (e.g., QinQ), a VxLAN, an LSP, a GRE tunnel, or other type of tunnel.

While illustrated and primarily described with respect to L3 connectivity, PE routers 302 may additionally offer, via access links 316, L2 connectivity between customer networks 308 and cloud service provider networks 320. For example, a port of PE router 302A may be configured with an L2 interface that provides, to customer network 308A, L2 connectivity to cloud service provider 320A via access link 316A, with the cloud service provider 320A router 312A coupled to a port of PE router 304A that is also configured with an L2 interface. The port of PE router 302A may be additionally configured with an L3 interface that provides, to customer network 308A, L3 connectivity to cloud service provider 320B via access links 316A. PE 302A may be configured with multiple L2 and/or L3 sub-interfaces such that customer 308A may be provided, by the cloud exchange provider, with a one-to-many connection to multiple cloud service providers 320.

To create an L2 interconnection between a customer network 308 and a cloud service provider network 320, in some examples, IP/MPLS fabric 301 is configured with an L2 bridge domain (e.g., an L2 virtual private network (L2VPN) such as a virtual private LAN service (VPLS), E-LINE, or E-LAN) to bridge L2 traffic between a customer-facing port of PEs 302 and a CSP-facing port of cloud service providers 320. In some cases, a cloud service provider 320 and customer 308 may have access links to the same PE router 302, 304, which bridges the L2 traffic using the bridge domain.

To create an L3 interconnection between a customer network 308 and a cloud service provider network 320, in some examples, IP/MPLS fabric 301 is configured with L3 virtual routing and forwarding instances (VRFs), as described in further detail below with respect to FIG. 4. In some cases, IP/MPLS fabric 301 may be configured with an L3 instance that includes one or more VRFs, and the L3 instance may link multiple cloud service provider networks 320. In this case, a customer network 308 may not need to be interconnected or have any physical presence in the cloud exchange or data center.

Each of access links 316 and aggregation links 322 may include a network interface device (NID) that connects customer network 308 or cloud service provider 328 to a network link between the NID and one of PE routers 302, 304. Each of access links 316 and aggregation links 322 may represent or include any of a number of different types of links that provide L2 and/or L3 connectivity.

In this example, customer network 308C is not an autonomous system having an autonomous system number. Customer network 308C may represent an enterprise, network service provider, or other customer network that is within the routing footprint of the cloud exchange point. Customer network includes a customer edge (CE) device 311 that may execute exterior gateway routing protocols to peer with PE router 302B over access link 316C. In various examples, any of PEs 310A-310B may alternatively be or otherwise represent CE devices.

Access links 316 include physical links. PE/ASBRs 310A-310B, CE device 311, and PE routers 302A-302B exchange L2/L3 packets via access links 316. In this respect, access links 316 constitute transport links for cloud access via cloud exchange point 303. Cloud exchange point 303 may represent an example of any of cloud exchange points 128. Data center 300 may represent an example of data center 201.

Cloud exchange point 303, in some examples, aggregates customers 308 access to the cloud exchange point 303 and thence to any one or more cloud service providers 320. FIGS. 3A-3B, e.g., illustrate access links 316A-316B connecting respective customer networks 308A-308B to PE router 302A of cloud exchange point 303 and access link 316C connecting customer network 308C to PE router 302B. Any one or more of PE routers 302, 304 may comprise ASBRs. PE routers 302, 304 and IP/MPLS fabric 301 may be configured according to techniques described herein to interconnect any of access links 316 to any of cloud aggregation links 322. As a result, cloud service provider network 320A, e.g., needs only to have configured a single cloud aggregate link (here, access link 322A) in order to provide services to multiple customer networks 308. That is, the cloud service provider operating cloud service provider network 302A does not need to provision and configure separate service links from cloud service provider network 302A to each of PE routers 310, 311, for instance, in order to provide services to each of customer network 308. Cloud exchange point 303 may instead connect cloud aggregation link 322A and PE 312A of cloud service provider network 320A to multiple cloud access links 316 to provide layer 3 peering and network reachability for the cloud services delivery.

In addition, a single customer network, e.g., customer network 308A, need only to have configured a single cloud access link (here, access link 316A) to the cloud exchange point 303 within data center 300 in order to obtain services from multiple cloud service provider networks 320 offering cloud services via the cloud exchange point 303. That is, the customer or network service provider operating customer network 308A does not need to provision and configure separate service links connecting customer network 308A to different PE routers 312, for instance, in order to obtain services from multiple cloud service provider networks 320. Cloud exchange point 303 may instead connect cloud access link 316A (again, as one example) to multiple cloud aggregate links 322 to provide layer 3 peering and network reachability for the cloud services delivery to customer network 308A.

Cloud service provider networks 320 each includes servers configured to provide one or more cloud services to users. These services may be categorized according to service types, which may include for examples, applications/software, platforms, infrastructure, virtualization, and servers and data storage. Example cloud services may include content/media delivery, cloud-based storage, cloud computing, online gaming, IT services, etc.

Cloud service provider networks 320 include PE routers 312A-312D that each executes an exterior gateway routing protocol, e.g., eBGP, to exchange routes with PE routers 304A-304B (collectively, "PE routers 304") of cloud exchange point 303. Each of cloud service provider networks 320 may represent a public, private, or hybrid cloud. Each of cloud service provider networks 320 may have an assigned autonomous system number or be part of the autonomous system footprint of cloud exchange point 303.

In the illustrated example, an Internet Protocol/Multiprotocol label switching (IP/MPLS) fabric 301 interconnects PEs 302 and PEs 304. IP/MPLS fabric 301 include one or more switching and routing devices, including PEs 302, 304, that provide IP/MPLS switching and routing of IP packets to form an IP backbone. In some example, IP/MPLS fabric 301 may implement one or more different tunneling protocols (i.e., other than MPLS) to route traffic among PE routers and/or associate the traffic with different IP-VPNs. In accordance with techniques described herein, IP/MPLS fabric 301 implement IP virtual private networks (IP-VPNs) to connect any of customers 308 with multiple cloud service provider networks 320 to provide a data center-based 'transport' and layer 3 connection.

Whereas service provider-based IP backbone networks require wide-area network (WAN) connections with limited bandwidth to transport service traffic from layer 3 services providers to customers, the cloud exchange point 303 as described herein 'transports' service traffic and connects cloud service providers 320 to customers 308 within the high-bandwidth local environment of data center 300 provided by a data center-based IP/MPLS fabric 301. In some examples, IP/MPLS fabric 301 implements IP-VPNs using techniques described in Rosen & Rekhter, "BGP/MPLS IP Virtual Private Networks (VPNs)," Request for Comments 4364, February 2006, Internet Engineering Task Force (IETF) Network Working Group, the entire contents of which is incorporated by reference herein. In some example configurations, a customer network 308 and cloud service provider network 320 may connect via respective links to the same PE router of IP/MPLS fabric 301.

Access links 316 and aggregation links 322 may include attachment circuits that associate traffic, exchanged with the connected customer network 308 or cloud service provider network 320, with virtual routing and forwarding instances (VRFs) configured in PEs 302, 304 and corresponding to IP-VPNs operating over IP/MPLS fabric 301. For example, PE 302A may exchange IP packets with PE 310A on a bidirectional label-switched path (LSP) operating over access link 316A, the LSP being an attachment circuit for a VRF configured in PE 302A. As another example, PE 304A may exchange IP packets with PE 312A on a bidirectional label-switched path (LSP) operating over access link 322A, the LSP being an attachment circuit for a VRF configured in PE 304A. Each VRF may include or represent a different routing and forwarding table with distinct routes.

PE routers 302, 304 of IP/MPLS fabric 301 may be configured in respective hub-and-spoke arrangements for cloud services, with PEs 304 implementing cloud service hubs and PEs 302 being configured as spokes of the hubs (for various hub-and-spoke instances/arrangements). A hub-and-spoke arrangement ensures that service traffic is enabled to flow between a hub PE and any of the spoke PEs, but not directly between different spoke PEs. As described further below, in a hub-and-spoke arrangement for data center-based IP/MPLS fabric 301 and for southbound service traffic (i.e., from a CSP to a customer) PEs 302 advertise routes, received from PEs 310, to PEs 304, which advertise the routes to PEs 312. For northbound service traffic (i.e., from a customer to a CSP), PEs 304 advertise routes, received from PEs 312, to PEs 302, which advertise the routes to PEs 310.

For some customers of cloud exchange point 303, the cloud exchange point 303 provider may configure a full mesh arrangement whereby a set of PEs 302, 304 each couple to a different customer site network for the customer. In such cases, the IP/MPLS fabric 301 implements a layer 3 VPN (L3VPN) for cage-to-cage or redundancy traffic (also known as east-west or horizontal traffic). The L3VPN may effectuate a closed user group whereby each customer site network can send traffic to one another but cannot send or receive traffic outside of the L3VPN.

PE routers may couple to one another according to a peer model without use of overlay networks. That is, PEs 310 and PEs 312 may not peer directly with one another to exchange routes, but rather indirectly exchange routes via IP/MPLS fabric 301. In the example of FIG. 3B, cloud exchange point 303 is configured to implement multiple layer 3 virtual circuits 330A-330C (collectively, "virtual circuits 330") to interconnect customer network 308 and cloud service provider networks 322 with end-to-end IP paths. Each of cloud service providers 320 and customers 308 may be an endpoint for multiple virtual circuits 330, with multiple virtual circuits 330 traversing one or more attachment circuits between a PE/PE or PE/CE pair for the IP/MPLS fabric 301 and the CSP/customer. A virtual circuit 330 represents a layer 3 path through IP/MPLS fabric 301 between an attachment circuit connecting a customer network to the fabric 301 and an attachment circuit connecting a cloud service provider network to the fabric 301. Each virtual circuit 330 may include at least one tunnel (e.g., an LSP and/or Generic Route Encapsulation (GRE) tunnel) having endpoints at PEs 302, 304. PEs 302, 304 may establish a full mesh of tunnels interconnecting one another.

Each virtual circuit 330 may include a different hub-and-spoke network configured in IP/MPLS network 301 having PE routers 302, 304 exchanging routes using a full or partial mesh of border gateway protocol peering sessions, in this example a full mesh of Multiprotocol Interior Border Gateway Protocol (MP-iBGP) peering sessions. MP-iBGP or simply MP-BGP is an example of a protocol by which routers exchange labeled routes to implement MPLS-based VPNs. However, PEs 302, 304 may exchange routes to implement IP-VPNs using other techniques and/or protocols.

In the example of virtual circuit 330A, PE router 312A of cloud service provider network 320A may send a route for cloud service provider network 320A to PE 304A via a routing protocol (e.g., eBGP) peering connection with PE 304A. PE 304A associates the route with a hub-and-spoke network, which may have an associated VRF, that includes spoke PE router 302A. PE 304A then exports the route to PE router 302A; PE router 304A may export the route specifying PE router 304A as the next hop router, along with a label identifying the hub-and-spoke network. PE router 302A sends the route to PE router 310B via a routing protocol connection with PE 310B. PE router 302A may send the route after adding an autonomous system number of the cloud exchange point 303 (e.g., to a BGP autonomous system path (AS_PATH) attribute) and specifying PE router 302A as the next hop router. Cloud exchange point 303 is thus an autonomous system "hop" in the path of the autonomous systems from customers 308 to cloud service providers 320 (and vice-versa), even though the cloud exchange point 303 may be based within a data center. PE router 310B installs the route to a routing database, such as a BGP routing information base (RIB) to provide layer 3 reachability to cloud service provider network 320A. In this way, cloud exchange point 303 "leaks" routes from cloud service provider networks 320 to customer networks 308, without cloud service provider networks 320 to customer networks 308 requiring a direct layer peering connection.

PE routers 310B, 302A, 304A, and 312A may perform a similar operation in the reverse direction to forward routes originated by customer network 308B to PE 312A and thus provide connectivity from cloud service provider network 320A to customer network 308B. In the example of virtual circuit 330B, PE routers 312B, 304A, 302A, and 310B exchange routes for customer network 308B and cloud service provider 320B in a manner similar to that described above for establishing virtual circuit 330B. As a result, cloud exchange point 303 within data center 300 internalizes the peering connections that would otherwise be established between PE 310B and each of PEs 312A, 312B so as to perform cloud aggregation for multiple layer 3 cloud services provided by different cloud service provider networks 320A, 320B and deliver the multiple, aggregated layer 3 cloud services to a customer network 308B having a single access link 316B to the cloud exchange point 303.

Absent the techniques described herein, fully interconnecting customer networks 308 and cloud service provider networks 320 would require 3×3 peering connections between each of PEs 310 and at least one of PEs 312 for each of cloud service provider networks 320. For instance, PE 310A would require a layer 3 peering connection with each of PEs 312. With the techniques described herein, cloud exchange point 303 may fully interconnect customer networks 308 and cloud service provider networks 320 with one peering connection per site PE (i.e., for each of PEs 310 and PEs 312) by internalizing the layer 3 peering and providing data center-based 'transport' between cloud access and cloud aggregate interfaces.

In examples in which IP/MPLS fabric 301 implements BGP/MPLS IP VPNs or other IP-VPNs that use route targets to control route distribution within the IP backbone, PEs 304 may be configured to import routes from PEs 302 and to export routes received from PEs 312, using different asymmetric route targets. Likewise, PEs 302 may be configured to import routes from PEs 304 and to export routes received from PEs 310 using the asymmetric route targets. Thus, PEs 302, 304 may configured to implement advanced L3VPNs that each includes a basic backbone L3VPN of IP/MPLS fabric 301 together with extranets of any of customer networks 308 and any of cloud service provider networks 320 attached to the basic backbone L3VPN.

Each advanced L3VPN constitutes a cloud service delivery network from a cloud service provider network 320 to one or more customer networks 308, and vice-versa. In this way, cloud exchange point 303 enables any cloud service provider network 320 to exchange cloud service traffic with any customer network 308 while internalizing the layer 3 routing protocol peering connections that would otherwise be established between pairs of customer networks 308 and cloud service provider networks 320 for any cloud service connection between a given pair. In other words, the cloud exchange point 303 allows each of customer networks 308 and cloud service provider networks 320 to establish a single (or more for redundancy or other reasons) layer 3 routing protocol peering connection to the data center-based layer 3 connect. By filtering routes from cloud service provider networks 320 to customer networks 308, and vice-versa, PEs 302, 304 thereby control the establishment of virtual circuits 330 and the flow of associated cloud service traffic between customer networks 308 and cloud service provider networks 320 within a data center 300. Routes distributed into MP-iBGP mesh 318 may be VPN-IPv4 routes and be associated with route distinguishers to distinguish routes from different sites having overlapping address spaces.

Programmable network platform 120 may receive service requests for creating, reading, updating, and/or deleting end-to-end services of the cloud exchange point 303. In response, programmable network platform 120 may configure PEs 302, 304 and/or other network infrastructure of IP/MPLS fabric 301 to provision or obtain performance or other operations information regarding the service. Operations for provisioning a service and performed by programmable network platform 120 may include configuring or updating VRFs, installing SDN forwarding information, configuring LSPs or other tunnels, configuring BGP, configuring access links 316 and aggregation links 322, or otherwise modifying the configuration of the IP/MPLS fabric 301. Other operations may include making service requests to an orchestration system for cloud service provider networks 320, as described in further detail below.

Customers 308 may be tenants of a public cloud and access cloud services provided by cloud service providers 110. In accordance with techniques described in this disclosure, cloud exchange 100 offers a cloud-to-cloud interface (CCI) for interconnecting cloud services to customers 308. Cloud service providers 320 may offer Platform-as-a-Service (PaaS), Software-as-a-Service (SaaS), Infrastructure-as-a-Service (IaaS), or Security-as-a-Service (SECaaS) (e.g., Distributed Denial of Service (DDoS) Mitigation-as-a-Service (DDoSMaaS)) to tenants that use public clouds to execute applications requiring access to SaaS or other cloud services accessible via cloud exchange 100. As described herein, cloud exchange points 303 may be configured with a cloud-to-cloud interface that enables tenant applications to subscribe to and communicate with cloud services, using an end-to-end layer 3 path, in some cases without requiring a separate routing protocol session with a public edge device for a public cloud that includes customers 308. In some examples, the public cloud may provide a virtual layer 2 connection from a tenant within the public cloud to a routing instance of cloud exchange point 303, and cloud exchange point 303 uses the routing instance to route service traffic between the tenant and the cloud services.

Figure 4:
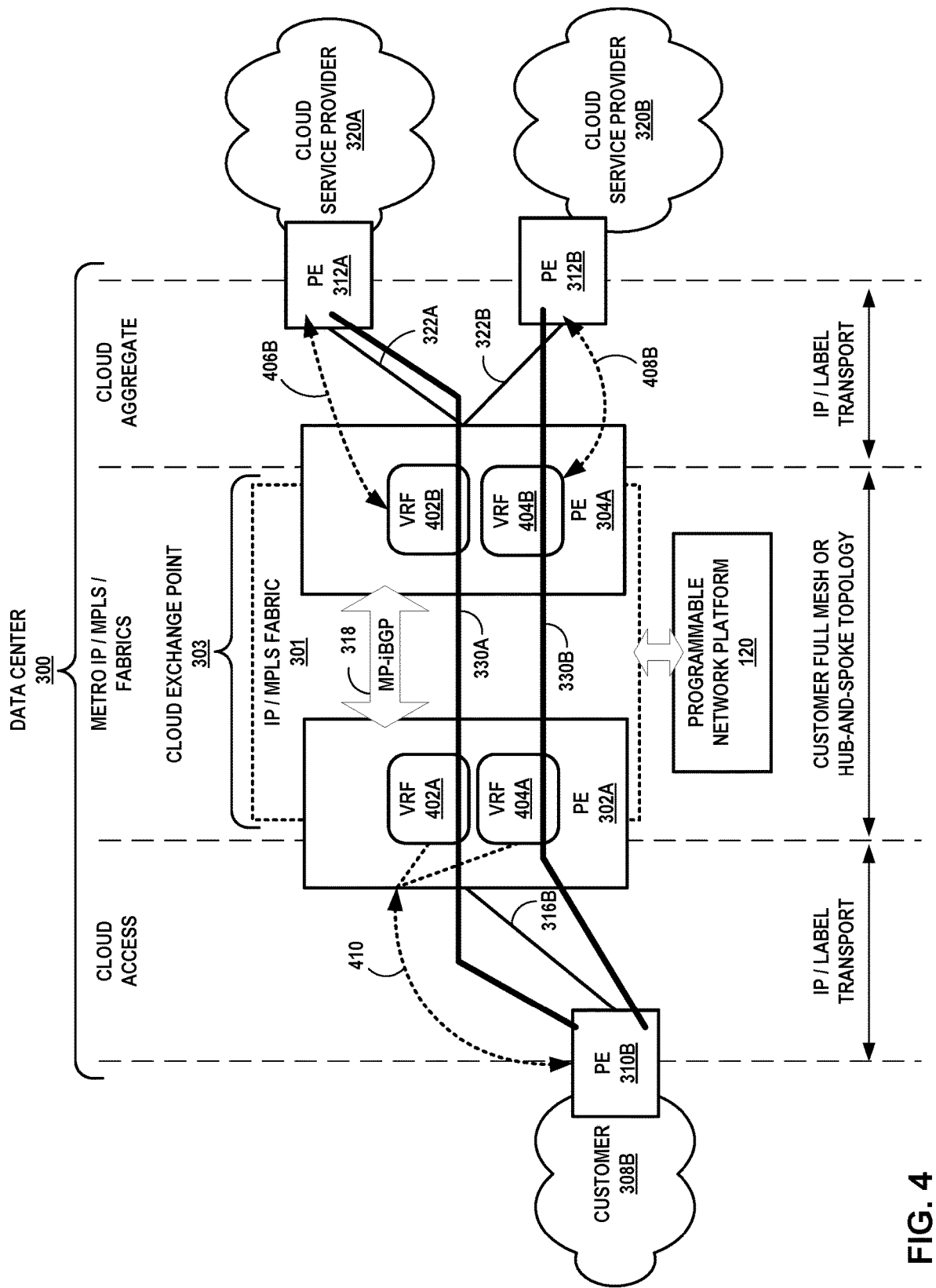
FIG. 4 is a block diagram illustrating an example of a data center-based cloud exchange point in which routers of the cloud exchange point are configured by programmable network platform with VPN routing and forwarding instances for routing and forwarding aggregated service traffic from multiple cloud service provider networks to a customer network, according to techniques described herein.

FIG. 4 is a block diagram illustrating an example of a data center-based cloud exchange point in which routers of the cloud exchange point are configured by programmable network platform 120 with VPN routing and forwarding instances for routing and forwarding aggregated service traffic from multiple cloud service provider networks to a customer network, according to techniques described herein. In this example, to establish virtual circuits 330A-330B, PE routers 302A and 304A of IP/MPLS fabric 301 are configured with VRFs. PE 302A is configured with VRFs 402A and 404A, while PE 304A is configured with VRFs 402B and 404B. VRF 402A is configured to import routes exported by VRF 402B, and VRF 402B is configured to import routes exported by VRF 402A. The configuration may include asymmetric route targets for import/export between VRFs 402A, 402B. VRF 404A is configured to import routes exported by VRF 404B, and VRF 404B is configured to import routes exported by VRF 404A. The configuration may include asymmetric route targets for import/export between VRFs 402A, 402B. This configuration whereby a customer can access multiple layer 3 services from different CSPs each associated with separate VRFs to access the layer 3 services provides isolation of respective traffic exchanged with the CSPs. In some examples, PE 302A may be configured with a single VRF to import routes exported by both VRF 402B and VRF 404B. As noted above with respect to FIGS. 3A-3B, PEs 302, 304 may be further configured to bridge layer 2 traffic between customer 308B and cloud service providers 320.

In this example, PE 304A operates BGP or other route distribution protocol peering connections 406B, 408B with respective PEs 312A, 312B to exchange routes with respective cloud service provider networks 320A, 320B. PE 302A operates a BGP or other route distribution protocol peering connection 410 with PE 310B to exchange routes with customer network 308B. In some examples, PEs 302A, 304A may be statically configured with routes for the site networks.

An administrator or a programmable network platform described herein for cloud exchange point 303 may configure PEs 302A, 304A with the VRF 402A-402B, 404A-404B in order to leak routes between PEs 312 and PE 310B and facilitate layer 3 connectivity for end-to-end IP paths illustrated here by virtual circuits 330, while potentially optimizing the end-to-end IP paths by fostering data center-based or at least metro-based connectivity. Cloud exchange point 303 may thus provide dedicated cloud service provider access to customer network 308B by way of private and/or public routes for the cloud service provider networks 320. In the northbound direction, cloud exchange point 303 may provide dedicated cloud service provider distribution to multiple customer networks 308 by way of private and/or public routes for the customer networks 308. Neither PE 310B nor any of PEs 302A, 304A need access to the full Internet BGP routing table to reach cloud service provider networks 320 or customer networks 308. Moreover, PEs 302A, 304A may be configured to aggregate customer/CSP routes and/or service traffic based on any one or more of physical, IP, service, and VRFs.

Figure 5:
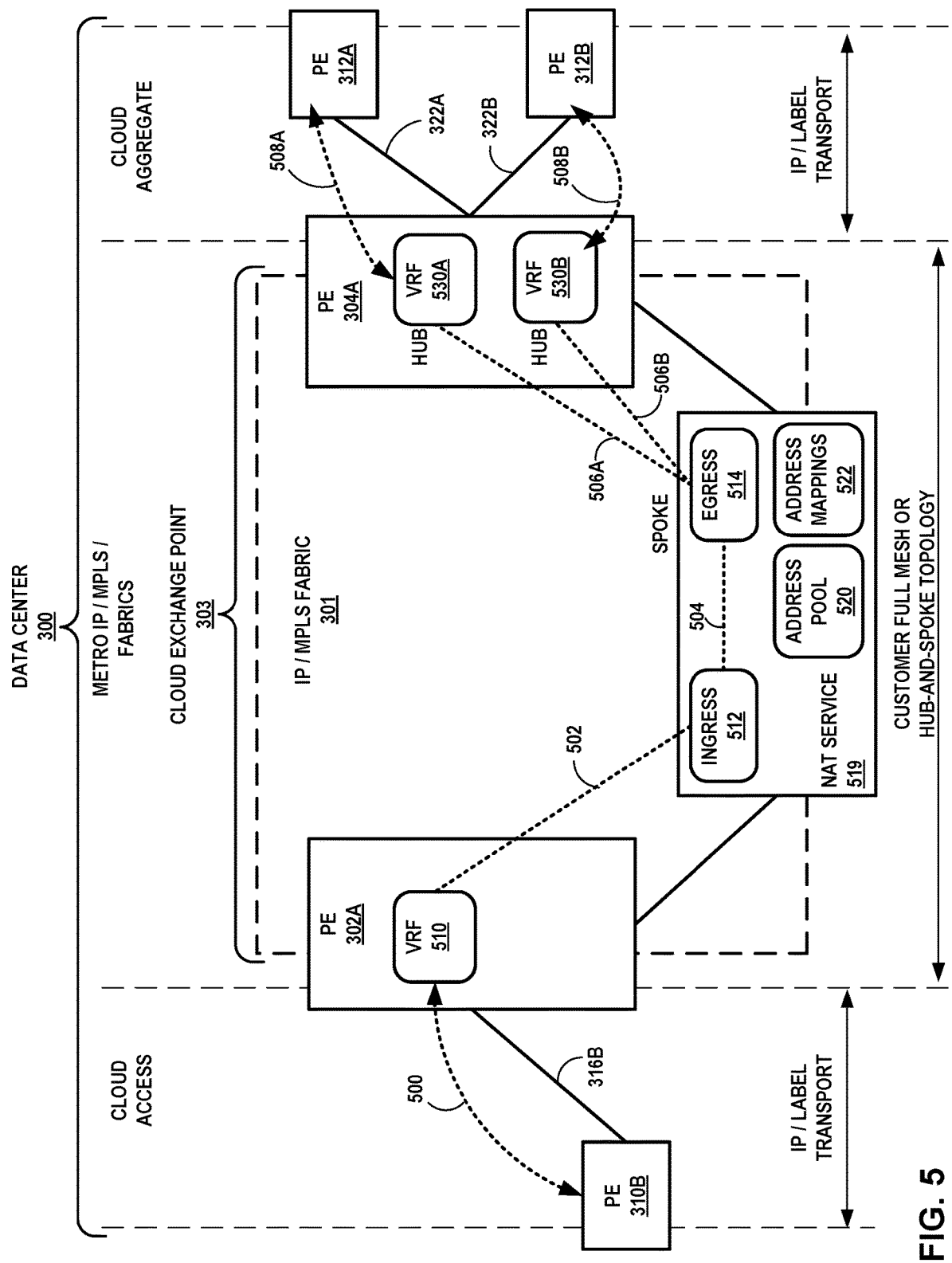
FIG. 5 is a block diagram illustrating an example of a data center-based cloud exchange point in which a cloud exchange point is configured to apply network address translation and to route and forward aggregated service traffic from multiple cloud service provider networks to a customer network, according to techniques described herein.

FIG. 5 is a block diagram illustrating an example of a data center-based cloud exchange point in which a cloud exchange point is configured to apply network address translation and to route and forward aggregated service traffic from multiple cloud service provider networks to a customer network, according to techniques described herein.

Cloud service provider networks 320 and customer networks 308 are not shown in FIG. 5 for ease of illustration purposes. In these examples, the data center-based cloud exchange point 303 applies a network address translation (NAT) service 519 to, in part, enforce network address separation between the cloud service layer accessible via cloud aggregation links 322 and the cloud access layer accessible via cloud access links 316.

A cloud exchange point 303 NAT device(s) that applies NAT service 519 performs NAT (or NAPT), which may also or alternatively include carrier-grade NAT ("CG-NAT" or "CGN"), to translate the cloud exchange point 303 addresses and CSP routes and/or to translate the cloud exchange point 303 addresses and customer routes. The cloud exchange point 303 NAT device(s) that applies NAT service 519 (also referred to herein as "NAT service 519 device") may include one or more dedicated NAT appliances, one or more virtual machines executing on real server(s) and configured to apply NAT using network function virtualization (NFV), one or more service cards configured to apply the NAT service 519 and inserted in one or more of PEs 302, 304, or other device(s) inbox or out-of-box.

NAT service 519 of FIG. 5 may be implemented in one or more NAT service devices. In FIG. 5, the NAT service 519 is associated with an address pool 520 that is configured with routes for the cloud exchange point 303 autonomous system and from which the NAT service 519 may draw to automatically provision and map, for NAT purposes, to customer and/or cloud service provider routes received via peering sessions 500 and 508A-508B, respectively. The network addresses for configured routes in address pool 520 (or "NAT pool 520") may be public, private, or a combination thereof, and may represent IPv4 and/or IPv6 routes. In some examples, the network addresses are public in order to provide global uniqueness for the network addresses.

Address mappings 522 may specify one or more NAT mappings and/or network address and port translations (NAPT) that associate routes from address pool 520 for the cloud exchange point 303 with routes received by the cloud exchange point 303 routers from any of PEs 310, 312. Routes received from any of PEs 310, 312 for translation and used in end-to-end service delivery may include any IP addresses/prefixes from enterprise/NSP customers of the cloud exchange provider, such addresses including private and/or public IPv4 and/or IPv6 addresses and received at any one or more of the cloud exchange points managed by the cloud exchange provider.

As noted above, NAT service 519 may perform NAT to translate customer routes for customer network 308B (not shown in FIG. 5) and cloud exchange point 303 routes advertised to PEs 312A, 312B for aggregated cloud access. As a result, CSP networks 320 (not shown in FIG. 5) receive the cloud exchange point 303 routes drawn from address pool 520 instead of the customer routes. The cloud exchange point 303 is thus able to filter customer network information from the CSPs, and the CSPs receive cloud exchange point 303 routes associated with a single autonomous system (i.e., the cloud exchange point 303 and one ASN per cloud exchange point) rather than customer routes (which could potentially number in the millions) associated with multiple different autonomous systems (and corresponding ASNs, which could potentially number in the hundreds) for various customers (enterprises and/or NSPs).

Further, because the cloud exchange point 303 does not advertise its routes other than to customers and CSPs, the cloud exchange point 303 does not announce its routes to the Internet, which may improve security and reduce the potential for Denial of Service (DoS) or other malicious activity directed to the cloud exchange point 303 and customers/CSPs with which the cloud exchange point 303 has peering relationships. In addition, the techniques described above may simplify end-to-end cloud service delivery processing and improve performance by ensuring that local traffic is processed locally (within the cloud exchange point 303).

In the illustrated example, NAT service 519 is associated with ingress service VRF 512 ("ingress 512") and egress service VRF 514 ("egress 514") for attracting service traffic that is associated with customer network 308B and that is to be NATted. Ingress 512 and egress 514 constitute part of a customer service chain for cloud service traffic between customer network 308B and CSP networks 320A, 320B. Customer VRF 510 associated customer network 308B receives routes from customer PE 310B via peering session 500. Customer VRF 510 may be configured in a VPN-full mesh relationship with ingress service VRFs distributed in the cloud exchange point 303 (only one peering session 502 is illustrated, however).

In some examples, PE 302A distributes, for VRF 510, customer routes received via peering session 500 to the NAT service 519, which dynamically maps the customer route prefixes to cloud exchange point route prefixes drawn from address pool 520. The customer routes are installed to ingress service VRF 512. The NAT service 519 installs the mappings to address mappings 522 and installs, to egress service VRF 514, cloud exchange point routes that specify the cloud exchange point route prefixes and NAT service 519 as the next hop. In this way, NAT service 519 and more specifically egress service VRF 514 attracts downstream traffic from CSP network 320 that is intended for the customer network 308B but destined for the cloud exchange point routes installed to egress service VRF 514. Ingress service VRF 512 and egress service VRF 514 may establish peering session 504 and be configured with route targets to cause VRFs 512, 514 to leak routes to one another via iBGP, for instance.

Egress service VRF 514 may operate as a spoke VRF for corresponding hub VRFRs 530A, 530B in a manner similar to VRFs of PE 302A operating as spoke VRFs in the example of FIG. 4. That is, egress service VRF 514 and VRFs 530A, 530B are configured with reciprocal route targets such that egress service VRF 514 advertises routes for the egress service VRF 514 for installation to VRFs 530A, 530B, while VRFs 530A, 530B advertise routes for corresponding CSP networks 320A, 320B to egress service VRF 514. NATted upstream service traffic destined to any of CSP networks 320A, 320B passes through corresponding hub VRFs 530A, 530B. Each of peering sessions 506A, 506B may be used in this way to create hub-and-spoke VPNs for the respective CSP networks 320A, 320B.

PEs 302, 304 may establish tunnels with the NAT service 519 device. Routes exchanged via peering sessions 502 and 506A, 506B may include labeled routes for implementing MPLS/BGP IP-VPNs according to RFC 4364, incorporated above.

Cloud exchange point 303 may forward and apply NAT service 519 to downstream service traffic from PE 312A, intended for customer network 308A, as follows. PE 304A receives a service packet on aggregation link 322A. The packet has a destination address that is a cloud exchange point 303 address drawn from address pool 520. VRF 530A associated with aggregation link 322A stores a route for the destination address that specifies an address for the NAT service 519 device, and PE 304A tunnels the packet using VRF 530A to the NAT service 519 device for application of the NAT service.

NAT service 519 uses address mappings 522 dynamically provisioned for routes for customer network 308A and received from PE 302A to perform NAT and replace the service packet destination address with a destination address in customer network 308A. The NAT service 519 device may determine in ingress service VRF 512 the labeled route to PE 302A (the label identifying VRF 510) and tunnel the modified service packet PE 302A, which may identify VRF 510 from the label attached to the modified service packet. PE 302A forwards the modified service packet to PE 310 via access link 316B. In this way, cloud exchange point 303 provides a NAT service to the customer to separate the customer from the cloud service layer. In a similar way, the cloud exchange point 303 may apply NAT to upstream traffic to separate cloud service providers from the cloud or network access layer by which customer networks access the cloud exchange point.

Figure 6:
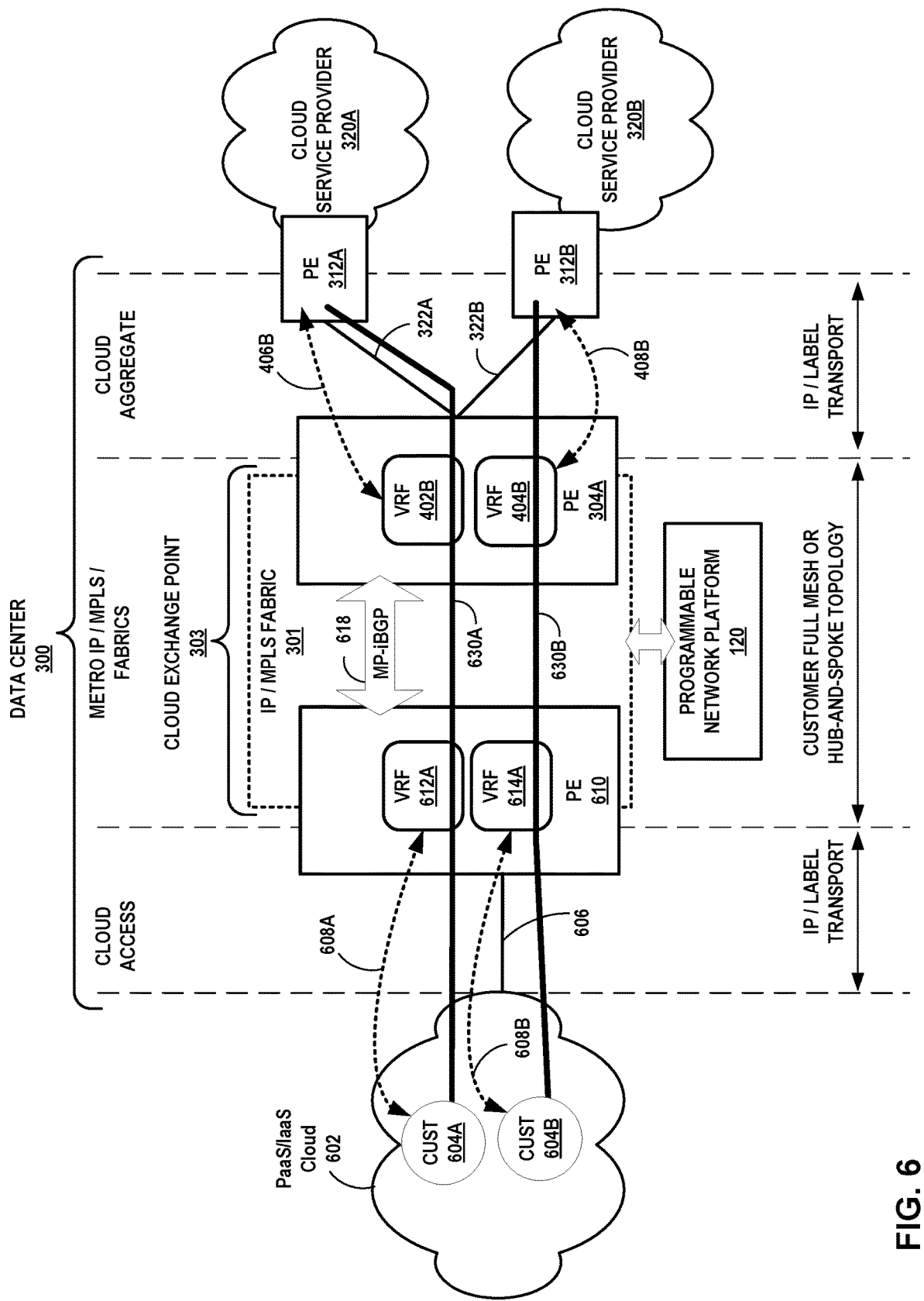
FIG. 6 is a block diagram illustrating an example of a data center-based cloud exchange point, according to techniques described herein.

FIG. 6 is a block diagram illustrating an example of a data center-based cloud exchange point, according to techniques described herein. In this example, PaaS/IaaS cloud 602 comprises a public cloud that offers PaaS and/or IaaS services to customers, e.g., any of cloud customers 108 from FIGS. 1-2 or customer networks 308 from FIGS. 3A, 3B, 4. In some examples, public cloud 602 may offer SaaS and/or Security-as-a-Service (SECaaS) (e.g., Distributed Denial of Service (DDoS) Mitigation-as-a-Service (DDoSMaaS)) services to customers. Customer tenants 604A and 604B (collectively, "customer tenants 604") each represent sub-networks of public cloud 602 that is allocated for a public cloud customer. Any of customer tenants 604 may represent a virtual private cloud, i.e., a configurable pool of computing resources allocated within the public cloud 602 infrastructure for use by the customer tenant. Customer tenants 604 may be isolated from one another in cloud 602 through allocation of a private IP subnet and a virtual communication channel for external, i.e., to the tenant, network communications.

Cloud exchange point 303 ("cloud exchange 303") may enable customers tenants 604 to directly connect to other cloud services providers, e.g., cloud service providers 320A and 320A (collectively, "cloud service providers 320"), so as to improve performance, reduce costs, increase the security and privacy of the connections, and leverage cloud computing for additional applications. In this way, public cloud customer tenants can at least in some aspects integrate other cloud services with their internal tenant applications as if such services are part of or otherwise directly coupled to the public cloud.

For example, the cloud-to cloud interface of cloud exchange 303 allows cloud customer tenants, including customer tenants 604 to be directly connected, via a layer 2 (L2) or layer 3 (L3) connection to any of cloud service provider 320A-320B (collectively, "cloud service providers 320"), thereby allowing exchange of cloud service traffic among the cloud customer tenants and/or CSPs 320. While customer tenants 604 typically operate as sellers of cloud services for PaaS, IaaS, SaaS, or SECaaS customers, the cloud-to-cloud interface of cloud exchange 303 allows customer tenants to also operate as buyers of cloud services from other CSPs. In this way, the cloud-to-cloud interface allows software developers associated with the customers of cloud exchange 303 (e.g., customers 108) to create software tenant applications that allow and leverage access to the programmable network platform 120 by which the tenant applications may request that the cloud exchange 303 establish connectivity between a customer tenant and cloud services offered by any of the CSPs 320. This cloud-to-cloud interface may allow customer tenant applications for public cloud customers, e.g., to obtain information regarding available cloud services, create virtual circuits of varying bandwidth to access cloud services, including dynamic selection of bandwidth based on a purchased cloud service to create on-demand and need based virtual circuits to or between other cloud service providers, delete virtual circuits, obtain active virtual circuit information, obtain details surrounding CSPs partnered with the cloud exchange provider, obtain customized analytics data, validate partner access to interconnection assets, and assure service delivery.

As described above, cloud service providers 320 each includes servers configured to provide one or more cloud services. These services may be categorized according to service types, which may include for examples, applications/ software, platforms, infrastructure, virtualization, and servers and data storage. Example cloud services may include authentication, encryption, decryption, key management, content delivery, cloud-based storage, cloud computing, IT services, or any other cloud service that could otherwise be made available to a cloud customer. In some examples, public cloud 602 and cloud service providers 320 are non-co-located. In other examples, public cloud 602 and cloud service providers 320 are co-located. In some examples, cloud exchange 303 and cloud service providers 320 are co-located.

In this example, a port of PE router 610 may be configured with an L2 interface that provides, to customer tenant 604A, L2 connectivity to cloud service provider 320A via access link 606, with the cloud service provider 320A router 312A coupled to a port of PE router 304A that is also configured with an L2 interface. The port of PE router 610 may be additionally configured with an L3 interface that provides, to customer tenant 604A, L3 connectivity to cloud service provider 320A via access link 606. A port of PE router 610 may be similarly configured to provide customer tenant 604A L2 or L3 connectively to cloud service provider 320B. In some examples, PE 610 may be configured with multiple L2 and/or L3 sub-interfaces such that customer tenant 604A may be provided, by the cloud exchange, with a one-to-many connection to multiple cloud service providers 320 (e.g., providing a connection from customer tenant 604A or 604B to CSP 320A and 320B).

Access link 606 includes physical links. Customer tenants 604 and PE router 610 exchange L2/L3 packets via access link 606. In this respect, access link 606 constitutes a transport link for cloud access via cloud exchange 303. In some examples, access link 606 may include a network interface device (NID) that connects public cloud 602 to a network link between the NID and one of PE router 610. Access link 606 may represent or include any of a number of different types of links that provide L2 and/or L3 connectivity. For example, access link 606 may operate over a VLAN or a stacked VLAN (e.g., QinQ), a VxLAN, an LSP, a GRE tunnel, or other type of tunnel.

In some examples, cloud exchange 303 aggregates customer tenants 604 access to the cloud exchange 303 and thence to any one or more cloud service providers 320. FIG. 6 illustrates access link 606 connecting public cloud 602 to PE router 610 of cloud exchange 303. In some examples, PE routers 610 and/or 304 may comprise ASBRs. PE routers 610, 304 and IP/MPLS fabric 301 may be configured according to techniques described herein to interconnect access link 606 to any of cloud aggregation links 322. As a result, cloud service provider network 320A, e.g., needs only to have configured a single cloud aggregate link (here, access link 322A) in order to provide services to multiple customer tenants 604. That is, the cloud service provider operating cloud service provider network 302A does not need to provision and configure separate service links from cloud service provider network 312A to PE routers of customer tenants 604, for instance, to provide services to each of customer tenants 604. Cloud exchange 303 may instead connect cloud aggregation link 322A and PE 312A of cloud service provider network 320A to access link 606 to provide layer 3 peering and network reachability for the cloud services delivery.

The cloud-to-cloud interface of cloud exchange 303 allows customer tenants 604 and PEs 312 to indirectly exchange routes via IP/MPLS fabric 301. In the example of FIG. 6, cloud exchange 303 is configured to implement multiple layer 3 virtual circuits 630A-630B (collectively, "virtual circuits 630") to interconnect each of customer tenants 604 and cloud service provider networks 320 with end-to-end IP paths. In some examples, each of cloud service providers 320 and customer tenants 604 may be an endpoint for multiple virtual circuits 630, with multiple virtual circuits 630 traversing one or more attachment circuits between a PE/PE pair for the IP/MPLS fabric 301 and the CSP/customer tenant. A virtual circuit 630 represents a layer 3 path through IP/MPLS fabric 301 between an attachment circuit connecting a customer tenant to the fabric 301 and an attachment circuit connecting a cloud service provider network to the fabric 301. Each virtual circuit 630 may include at least one tunnel (e.g., an LSP and/or Generic Route Encapsulation (GRE) tunnel) having endpoints at PEs 610, 304. PEs 610, 304 may establish a full mesh of tunnels interconnecting one another.

In this example, PE routers 610 and 304A of IP/MPLS fabric 301 are configured with VRFs to establish virtual circuits 630A-630B. For example, PE 610 is configured with cloud customer VRFs 612A and 614A, while PE 304A is configured with CSP VRFs 402B and 404B. Cloud customer VRF 612A is configured to import routes exported by CSP VRF 402B, and CSP VRF 402B is configured to import routes exported by cloud customer VRF 612A. The configuration may include asymmetric route targets for import/export between VRFs 612A, 402B. Cloud customer VRF 614A is configured to import routes exported by CSP VRF 404B, and CSP VRF 404B is configured to import routes exported by cloud customer VRF 614A. The configuration may include asymmetric route targets for import/export between VRFs 614A, 404B. In this way, a customer tenant can access multiple layer 3 services from different CSPs each associated with separate VRFs to access the layer 3 services provides isolation of respective traffic exchanged with the CSPs. In some examples, PE 620 may be configured with a single VRF to import routes exported by both CSP VRFs 402B and 404B. In some examples, PE 304A may be configured with a single VRF to import routes exported by both VRFs 612A and 614A. As noted above, PEs 610, 304 may be further configured to bridge layer 2 traffic between public cloud 602 and cloud service providers 320.

The cloud-to-cloud interface in this example includes separate external BGP (eBGP) or other router distribution protocol peering sessions between each customer tenants 604 and cloud exchange 303. As shown in FIG. 6, PE 610 operates peering connection 608A (e.g., eBGP) between cloud customer VRF 612A and customer tenant 604A to exchange routes with customer tenant 604A. Similarly, PE 610 operates a separate peering connection 608B between cloud customer VRF 614A and customer tenant 604B to exchange routes with customer tenant 604B. In this way, cloud customer VRFs 612A, 614A receive routes from customer tenants 604A, 604B via peering connections 608A, 608B, respectively. PE 304A similarly operates peering connections 406B, 408B (e.g., eBGP peering connections) with respective PEs 312A, 312B to exchange routes with respective cloud service provider networks 320A, 320B. While only two customer tenants 604 are shown in FIG. 6, public cloud 602 may include fewer or more customer tenants, each with a separate eBGP connection to a VRF of PE 610.

Consequently, cloud exchange point 303 (and more specifically in this example, PE 610) terminates the layer 3 connections with each of customer tenants 604 such that the public cloud 602 effectively operates as a layer 2 access network for the connection to any services accessible via cloud exchange point 303. Cloud exchange point 303 may therefore be a first BGP next-hop for customer tenants 604. In contrast to direct connections such as ExpressRoute for Microsoft Azure public cloud and Direct Connect for Amazon Web Services public cloud, the cloud-to-cloud interface is not a cloud-specific connection and allows the customer tenants 604 to subscribe to cloud-agnostic services to receive cloud services from, e.g., SaaS providers on layer 3 connections. The above direct connections require configuration of the public cloud 602 edge router and require NAT for private addresses, while cloud-to-cloud interface supports both private IP addresses per RFC 1918 and public IP addresses. The services using cloud-to-cloud interface need not be routed to a customer's own premises, for instance. As another advantage, the services need not have direct connections to the public cloud 602. Rather, a customer tenant 604 with a cloud-to-cloud interface configured with cloud exchange point 303 can access any services, provided by any cloud network or co-located in data center 300 or via an NSP, that have connections to cloud exchange point 303. In effect, PE router 610 may operate as a gateway edge router for the layer 2 access network that is public cloud 602 for customer tenants 604.

An administrator or a programmable network platform 120 described herein for cloud exchange 303 may establish the cloud-to-cloud interface by configuring PEs 610, 304A with the VRF 612A-614A, 402B-404B, respectively, in order to leak routes between PEs 312 and customer tenants 604 and facilitate layer 3 connectivity for end-to-end IP paths illustrated here by virtual circuits 630, while potentially optimizing the end-to-end IP paths by fostering data center-based or at least metro-based connectivity. Cloud exchange 303 may thus provide dedicated cloud service provider access to customer tenants 604 by way of private and/or public routes for the cloud service provider networks 320. In the northbound direction, cloud exchange 303 may provide dedicated cloud service provider distribution to multiple customer tenants 604 by way of private and/or public routes for the customer tenants 604. Neither customer tenants 604 or any of PEs 610, 304A need access to the full Internet BGP routing table to reach cloud service provider networks 320 or customer tenants 604. Moreover, PEs 610, 304A may be configured to aggregate customer tenant/CSP routes and/or service traffic based on any one or more of physical, IP, service, and VRFs.

The cloud-to-cloud interface thereby supports non-colocation (i.e., not located in data center 300) customers of the data center/cloud exchange point provider by enabling such customers to subscribe to any existing cloud service accessible via cloud exchange point 303. This cloud-to-cloud interface service for customer tenant 604A, for instance, may reuse the layer 2 access link (e.g., VLAN) between PE 610 and customer tenant 604A that customer tenant 604A uses for its private subnets and for external communications. The customer may input this layer 2 access link information to a customer portal to configure the PEs of cloud exchange point 303 with the layer 2 access link information to realize the cloud-to-cloud interface. Layer 2 access link information may include VLAN identifier or other layer 2 link configuration data.

The cloud-to-cloud interface exists at the boundary between the public cloud 602 and cloud exchange point 303, which are separate administrative domains. In some examples, the public cloud 602 provider provides a layer 2 connection to cloud exchange point 303 (e.g., with EVPN onboarding), and a customer tenant 604 can be onboarded to the cloud exchange point 303 as a layer 3 non-colocation customer with VRF onboarding (e.g., for ESK services). The cloud-to-cloud interface may allow customer tenants 604 to subscribe to existing cloud services provided by cloud service provider networks 320, or by cloud exchange point 303. In addition, the requirements to onboard layer 3 non-colocation customers such as customer tenants 604 are conformed to and become the same as colocation customers in data center 300.

To subscribe a customer tenant 604 to any of the cloud services accessible via cloud exchange point 303, the cloud exchange point 303 provider modifies PE 610 to cause the corresponding VRF for the customer to import routes from the corresponding VRF for the cloud service provider network that offers the cloud service. PE 610 may then forward cloud service traffic between the customer tenant 604 and the cloud service provider network 320. A customer may select a cloud service from a customer portal of the cloud exchange point 303 provider to prompt the provider to subscribe the customer tenant 604 to the selected cloud service. In some examples, two service keys are needed for non-colocation customers. For example, one key for local access from IaaS/PaaS and another key for remote service subscription.

Figure 7:
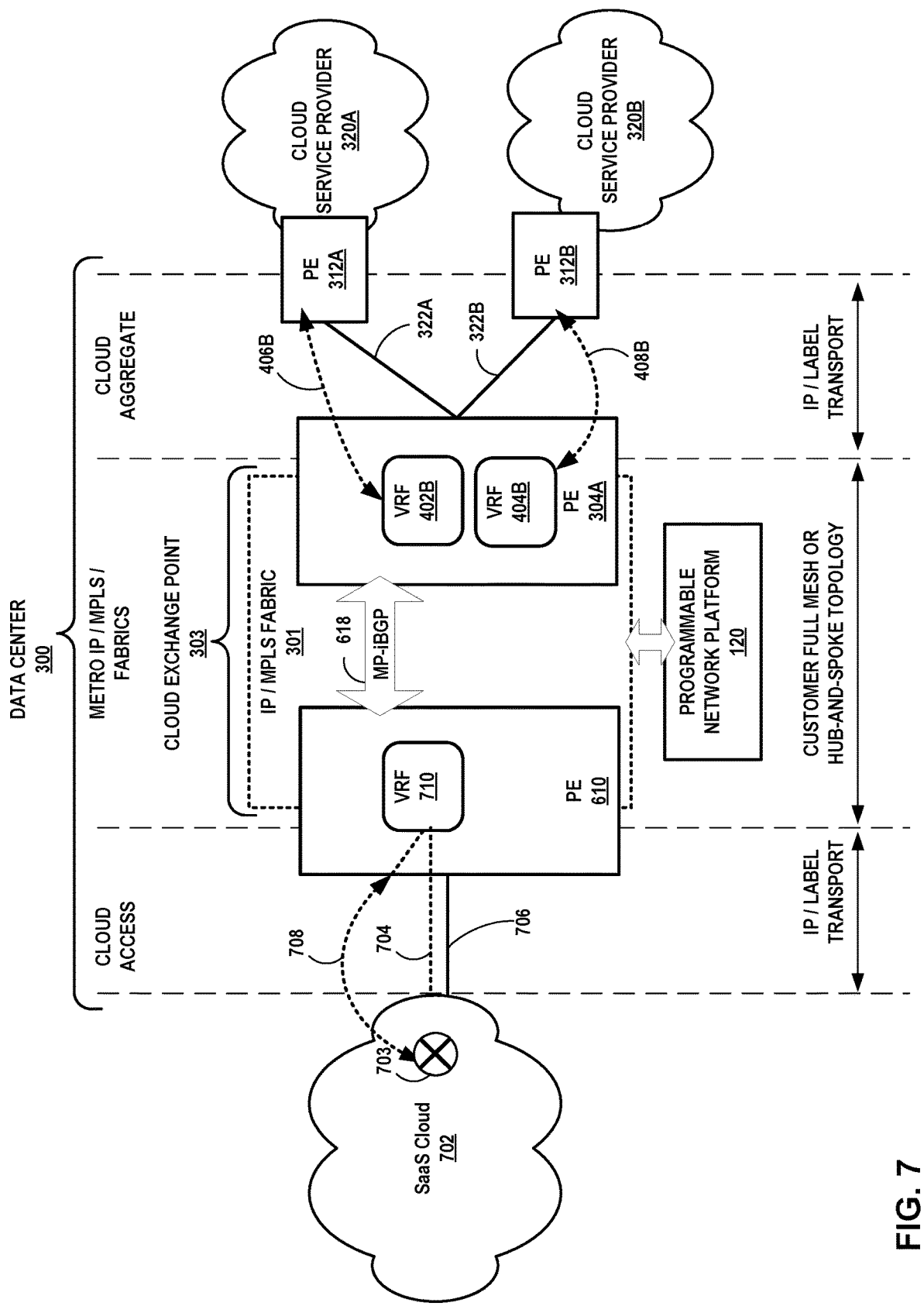
FIG. 7 is a block diagram illustrating an example of a data center-based cloud exchange point in which a cloud exchange point is configured with a cloud-to-cloud interface for service traffic between SaaS cloud tenants and cloud service provider networks, according to techniques described herein.

FIG. 7 is a block diagram illustrating an example of a data center-based cloud exchange point in which a cloud exchange point is configured with a cloud-to-cloud interface for service traffic between SaaS cloud 702 and cloud service provider networks, according to techniques described herein. In this example, SaaS cloud 702 comprises a public cloud that offers SaaS services to customers, e.g., any of cloud customers 108 from FIGS. 1-2 or customer networks 308 from FIGS. 3A, 3B, 4, that includes a single access link 706 to cloud exchange 303. In some examples, public cloud 702 may offer Security-as-a-Service (SECaaS) (e.g., Distributed Denial of Service (DDoS) Mitigation-as-a-Service (DDoSMaaS)) services to customers. Public cloud 702 may route service traffic to customers via layer 2 service access connection 704. In some examples, public cloud 702 may route service traffic to customers via a layer 3 service access connection. That is, public cloud 702 may subscribe cloud services from cloud services providers 320 for its customers (not shown) and manage cloud service bandwidth. In some examples, public cloud 702 and cloud service providers 320 are non-co-located. In other examples, public cloud 702 and cloud service providers 320 are co-located.

In this example, public cloud 702 includes gateway router 703 that executes an exterior gateway routing protocol, e.g., eBGP, 708 to exchange routes with cloud customer VRF 710 of PE router 610. Cloud customer VRF 710 is configured to import routes exported by both CSP VRFs 402B and 404B, and each of CSP VRFs 402B and 404B is configured to import routes exported by cloud customer VRF 710. While only one cloud customer VRF is shown in FIG. 7, PE router 610 may be configured with additional cloud customer VRFs with each additional cloud customer VRF corresponding to a different public cloud/gateway router. In some examples, PE 304A may be configured with a single VRF to import routes exported by VRF 710.

Programmable network platform 120 may receive service requests for creating, reading, updating, and/or deleting end-to-end services of the cloud exchange 303 for public cloud 702. In response, programmable network platform 120 may configure PEs 610, 304A and/or other network infrastructure of IP/MPLS fabric 301 to provision or obtain performance or other operations information regarding the service. Operations for provisioning a service and performed by programmable network platform 120 may include configuring or updating VRFs 710, 402B, 404B, installing SDN forwarding information, configuring LSPs or other tunnels, configuring eBGP 708, configuring access links 706 and aggregation links 322, or otherwise modifying the configuration of the IP/MPLS fabric 301.

Once on-boarded, the SaaS cloud 702 can directly connect via the cloud-to-cloud interface to cloud services offered by cloud service provider 320 networks.

Figure 8A:
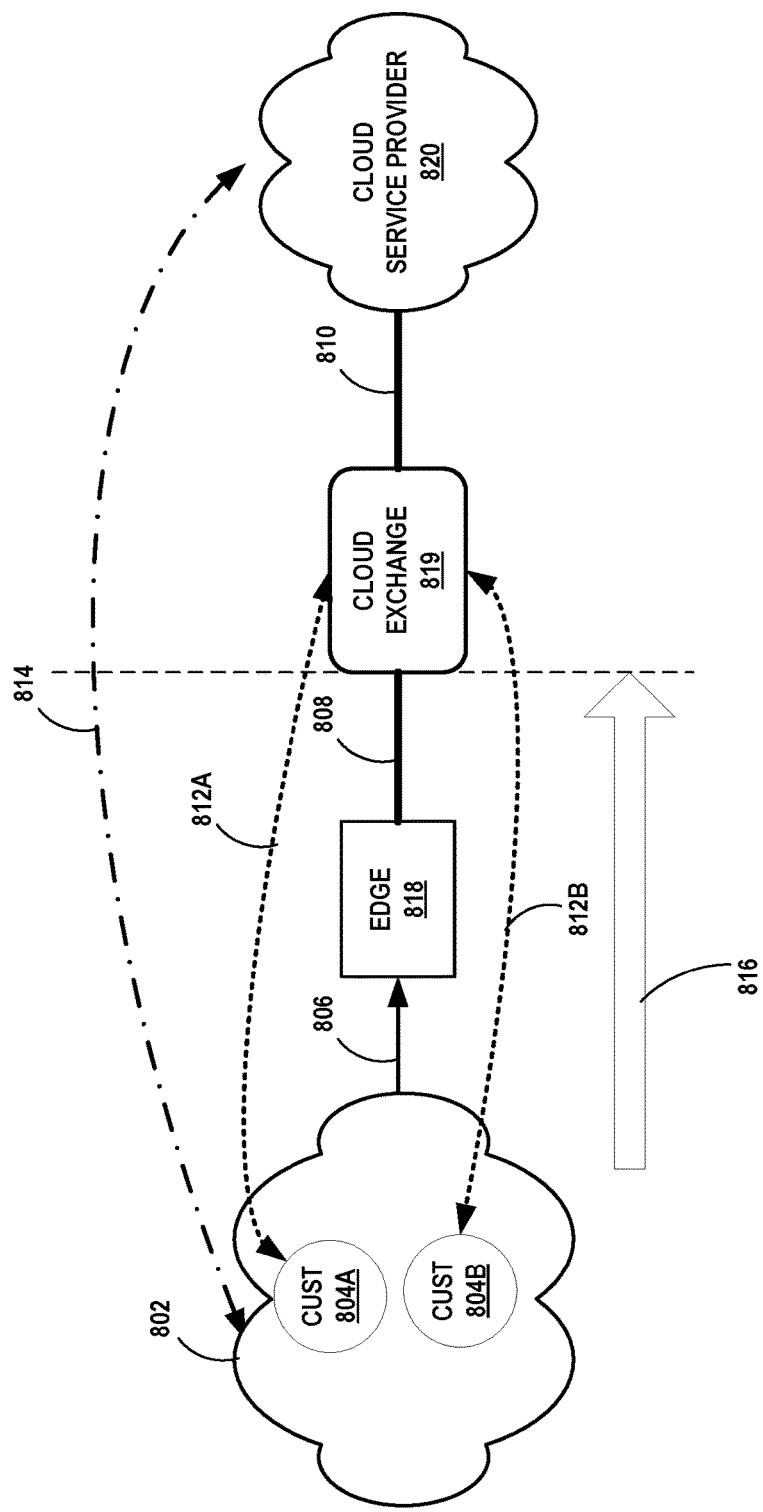
FIGS. 8A-8C and FIGS. 9-10 are block diagrams illustrating example use cases in accordance with one or more aspects of the techniques of this disclosure.

FIG. 8A is a block diagram illustrating an example use case in accordance with one or more aspects of the techniques of this disclosure. In this example, public cloud 802 offers PaaS, IaaS, SaaS, or SECaaS services to customers, e.g., any of cloud customers 108 from FIGS. 1-2 or customer networks 308 from FIGS. 3A, 3B, 4. In some examples, public cloud 802 may correspond to public cloud 602 of FIG. 6 or public cloud 702 of FIG. 7. Customer tenants 804A and 804B (collectively, "customer tenants 804") each represent sub-networks of public cloud 802 that is allocated for a public cloud tenant. Cloud exchange 819 may enable customer tenants 804 to directly connect to cloud service provider network 820, so as to improve performance, reduce costs, increase the security and privacy of the connections, and leverage cloud computing for additional applications. In this way, public cloud customer tenants 804 can integrate other cloud services with their internal tenant applications as if such services are part of or otherwise directly coupled to their own data center network. In some examples, public cloud 802 may use a transport layer security (TLS) protocol 814 for secure communications and data transmissions between internal tenant applications and cloud service provider 820. In other examples, a secure sockets layer (SSL) protocol may be used for secure communications and data transmissions between internal tenant applications and cloud service provider 820.

In some examples, cloud service provider network 820 represents a deployment of host devices "at the network edge" by the cloud exchange 819 provider within a data center that hosts cloud exchange 819. As a result, a customer of the cloud exchange provider that has a virtual private cloud or other hosted application workloads within public cloud 802 can access, from the hosted application workloads within public cloud 802, cloud services offered by the cloud exchange 819 provider at the network edge. This may reduce latency of the cloud services access from the public cloud 802, which may be particularly beneficial for some applications, such as IoT, mobile, or other applications that are geographically distributed.

In this example, the cloud-to cloud interface 816 of cloud exchange 819 allows cloud customer tenants, including customer tenants 804 to be directly connected, via a layer 2 (L2) or layer 3 (L3) connection to cloud service provider 820, thereby allowing exchange of cloud service traffic among the cloud customer tenants 804 and/or cloud service provider 820. Cloud-to-cloud interface 816 in this example comprises separate external BGP (eBGP) or other router distribution protocol peering connections 812A, 812B between customer tenants 804A, 804B, respectively and cloud exchange 819. While only two customer tenants 804 are shown in FIG. 8A, public cloud 602 may include fewer or more customer tenants, each with a separate eBGP connection to cloud exchange 819. FIG. 8A further illustrates link 810 between cloud exchange 819 and cloud service provider 820. In some examples, link 810 may correspond to any of aggregate links 322 of FIGS. 3A, 3B, 4-7, and may be used to exchange cloud service traffic between cloud exchange 819 and cloud service provider 820.

In this example, public cloud 802 includes an edge device 818, via link 806, that may execute exterior gateway routing protocols to peer with cloud exchange 819 over access link 808. In various examples, any of PEs 310A-310B may alternatively be or otherwise represent CE devices. For example, edge 818 may operates an eBGP or other router distribution protocol peering connection between edge device 818 and cloud exchange point 819. In some examples, cloud exchange 819 may provide Virtual eXtensible LAN (VXLAN) support for L3 CSPs, providing L3 encapsulation for RFC 1918 traffic.

Figure 8B:
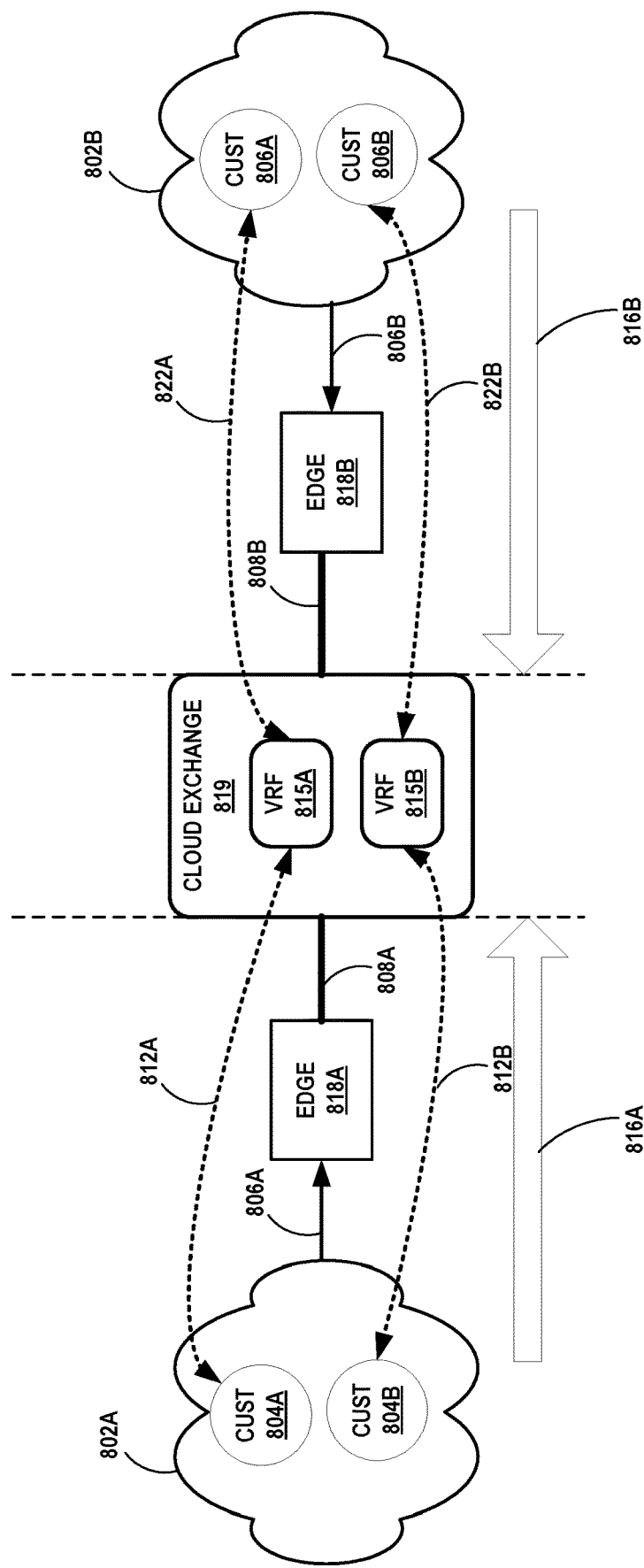

FIG. 8B is a block diagram illustrating another example use case in accordance with one or more aspects of the techniques of this disclosure. In this example, public cloud 802A corresponds to public cloud 802 of FIG. 8A. Both public clouds 802A and 802B (collectively, "public clouds 802") offer PaaS, IaaS, SaaS, or SECaaS services to customers, e.g., any of cloud customers 108 from FIGS. 1-2 or customer networks 308 from FIGS. 3A, 3B, 4. In some examples, public clouds 802 may be different cloud providers located in the same data center or in different data centers. Customer tenants 806A and 806B (collectively, "customer tenants 806") each represent sub-networks of public cloud 802B that are allocated for a public cloud tenant. In some examples, customer tenant 804A of public cloud 802A and customer tenant 806A of public cloud 802B may correspond to the same customer. Similarly, customer tenant 804B of public cloud 802A and customer tenant 806B of public cloud 802B may correspond to the same customer. In this example, customer tenants 804 and 806 may be non-colocated. Cloud exchange 819 may enable customer tenants 804 to directly connect to customer tenants 806, so as to improve performance, reduce costs, increase the security and privacy of the connections, and leverage cloud computing for additional applications. In this way, public cloud customer tenants 804 and 806 can integrate cloud data and/or services with their internal tenant applications as if such data and/or services are part of or otherwise directly coupled to their own data center network.

In this example, the cloud-to-cloud interfaces 816A and 816B (collectively, "cloud-to-cloud interfaces 816") of cloud exchange 819 allow cloud customer tenants, including customer tenants 804 to be directly connected, via a layer 2 (L2) or layer 3 (L3) connections to customer tenants 806, thereby allowing exchange of cloud service traffic among cloud customer tenants 804 and/or 806. Cloud-to-cloud interface 816A in this example comprises separate eBGP or other router distribution protocol peering connections 812A, 812B between customer tenants 804A, 804B and cloud exchange 819, respectively. Cloud-to-cloud interface 816B in this example comprises separate eBGP or other router distribution protocol peering connections 822A, 822B between customer tenants 806A, 806B and cloud exchange 819, respectively.

In this example, public cloud 802A includes an edge device 818A, via link 806A, that may execute exterior gateway routing protocols to peer with cloud exchange 819 over access link 808A. For example, edge device 818A may operate an exterior gateway routing protocol, e.g., eBGP, connections 812A, 812B to exchange routes with cloud customer VRFs 815A, 815B, respectively, of cloud exchange 819. Similarly, public cloud 802B includes an edge device 818B, via link 806B, that may execute exterior gateway routing protocols to peer with cloud exchange 819 over access link 808B. For example, edge device 818B may operate eBGP connections 822A, 822B to exchange routes with cloud customer VRFs 815A, 815B, respectively of cloud exchange 819. As shown in FIG. 8B, a single customer VRF 815A is shared between customer tenants 804A, 806A and a single customer VRF 815B is shared between customer tenants 804B, 806B. In some examples, cloud exchange 819 manages connections 812 and/or 822.

Figure 8C:
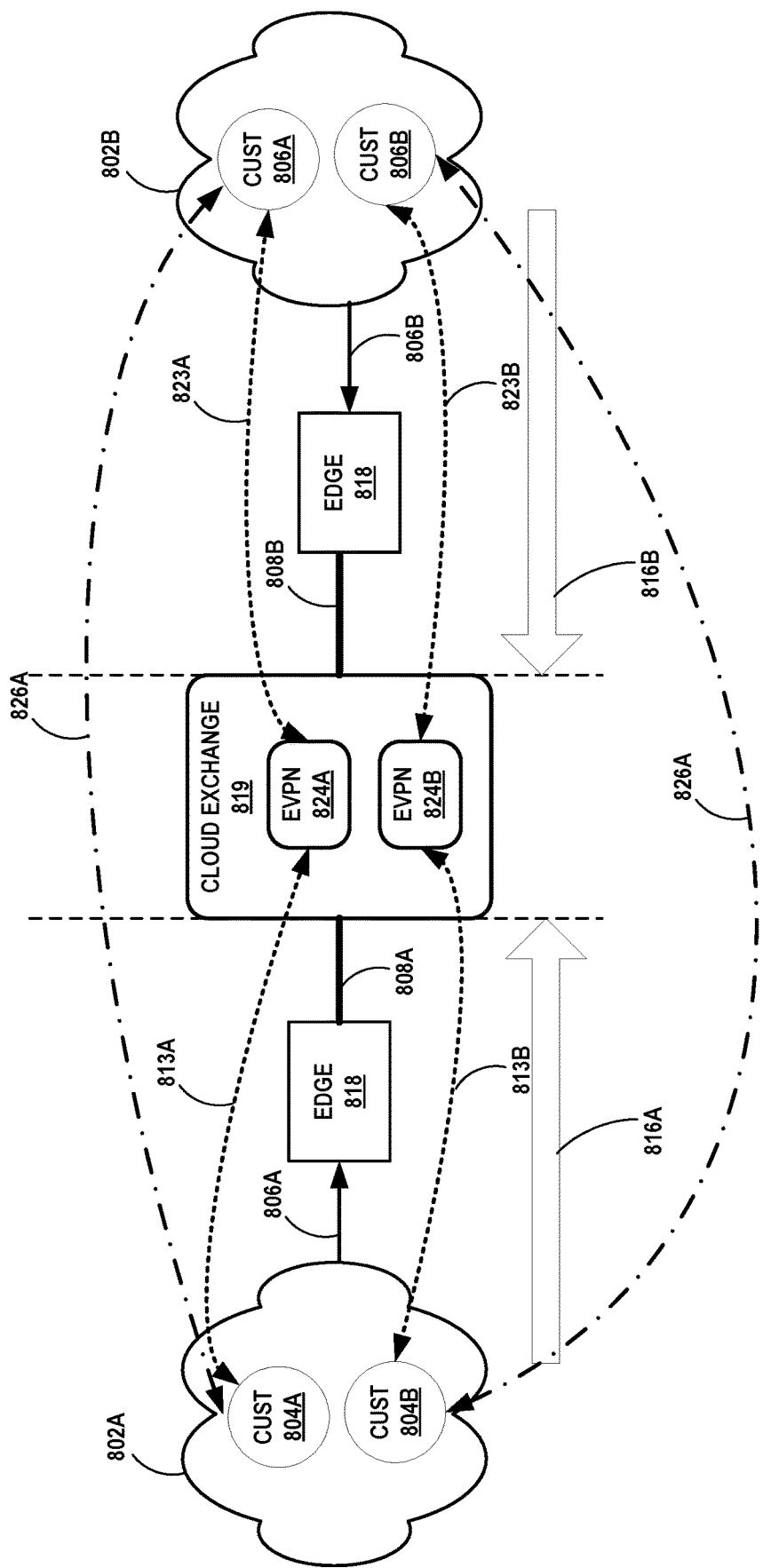

FIG. 8C is a block diagram illustrating another example use case in accordance with one or more aspects of the techniques of this disclosure. In this example, public clouds 802 correspond to public cloud 802 of FIG. 8B. Similar to the example in FIG. 8B, cloud exchange 819 of FIG. 8C may enable customer tenants 804 to directly connect to customer tenants 806, so as to improve performance, reduce costs, increase the security and privacy of the connections, and leverage cloud computing for additional applications. In this way, public cloud customer tenants 804 and 806 can integrate cloud data and/or services with their internal tenant applications as if such data and/or services are part of or otherwise directly coupled to their own data center network.

In this example, cloud-to-cloud interfaces 816 of cloud exchange 819 allow cloud customer tenants, including customer tenants 804 to be directly connected, via a layer 2 (L2) or layer 3 (L3) connections to customer tenants 806, thereby allowing exchange of cloud service traffic among cloud customer tenants 804 and/or 806. Cloud-to-cloud interface 816A in this example comprises separate eBGP or other router distribution protocol peering connections 812A, 812B between customer tenants 804A, 804B and cloud exchange 819, respectively. Cloud-to-cloud interface 816B in this example comprises separate eBGP or other router distribution protocol peering connections 822A, 822B between customer tenants 806A, 806B and cloud exchange 819, respectively.

In this example, public cloud 802A includes an edge device 818A, via link 806A, that may execute exterior gateway routing protocols to peer with cloud exchange 819 over access link 808A. For example, edge device 818A may operate L2 virtual bridges 813A, 813B to exchange routes with cloud customer EVPNs 824A, 824B, respectively, of cloud exchange 819. Similarly, public cloud 802B includes an edge device 818B, via link 806B, that may execute exterior gateway routing protocols to peer with cloud exchange 819 over access link 808B. For example, edge device 818B may operate L2 virtual bridges 823A, 823B to exchange routes with cloud customer EVPNs 824A, 824B, respectively of cloud exchange 819. As shown in FIG. 8B, a single customer EVPN 824A is shared between customer tenants 804A, 806A and a single customer EVPN 824B is shared between customer tenants 804B, 806B. In some examples, public clouds 802 manage connections 812 and/or 822. In some examples, cloud exchange 819 and/or public clouds 802 manage layer 2 connections between customer tenants 804, 806 and cloud exchange 819.

Figure 9:
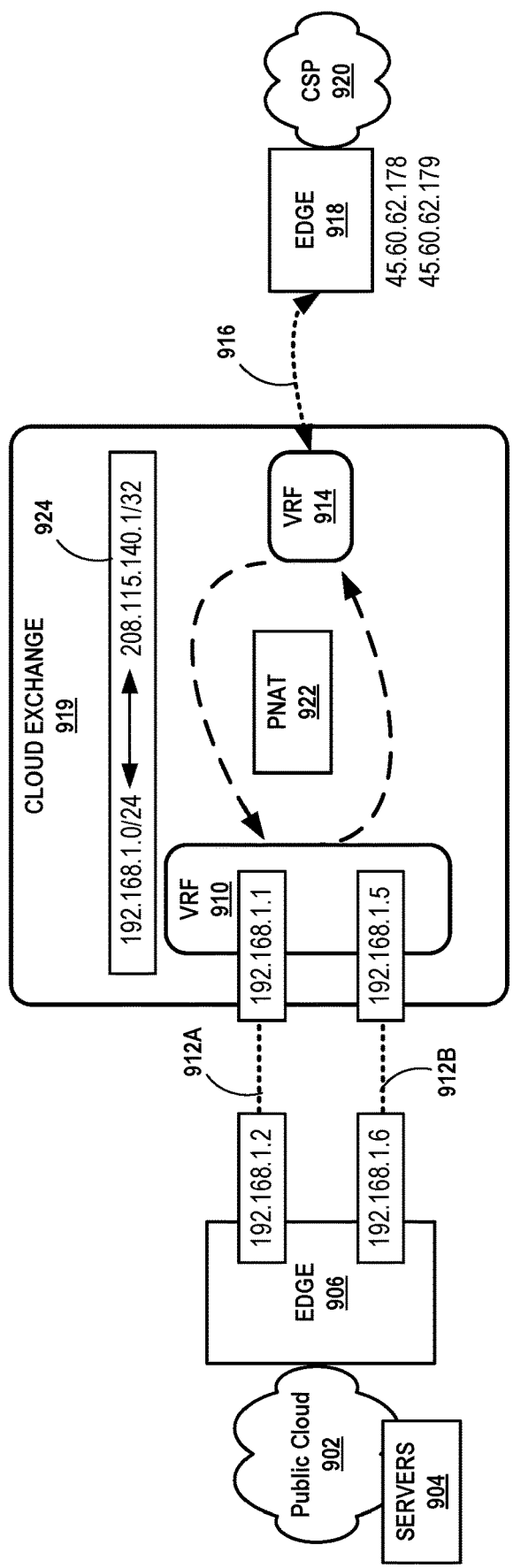

FIG. 9 is a block diagram illustrating another example use case in which cloud exchange 919 is configured to apply network address translation and to route and forward cloud service traffic from public cloud 902 to and from cloud service provider 920, in accordance with one or more aspects of the techniques of this disclosure. In this example, public cloud 902 comprises servers 904 and offers PaaS, IaaS, SaaS, or SECaaS services to customers, e.g., any of cloud customers 108 from FIGS. 1-2 or customer networks 308 from FIGS. 3A, 3B, 4. In some examples, public cloud 902 may correspond to public cloud 602 of FIG. 6 or public cloud 702 of FIG. 7. As shown in FIG. 9, public cloud 902 includes edge 906 that operates exterior gateway routing protocol, e.g., eBGP, connections 912A, 912B (collectively, "eBGP connections 912") to exchange routes with cloud customer VRF 910 of cloud exchange 919. While this example includes two eBGP connections 912 for redundancy, in other examples fewer or more eBGP connections may be configured between a public cloud edge device and a cloud customer VRF of cloud exchange 919. Similarly, cloud service provider 920 includes edge 918 that operates eBGP connection 916 to exchange routes with CSP VRF 914 of cloud exchange 919.

In this example, cloud exchange 919 applies a port network address translation (PNAT or NAT) service to, in part, enforce network address separation between the cloud service layer accessible via eBGP connection 916 and the cloud access layer accessible via eBGP connections 912. In some examples, the PNAT device(s) 922 may also or alternatively include carrier-grade NAT ("CG-NAT" or "CGN"), to translate the cloud exchange 919 addresses and CSP 920 routes and/or to translate the cloud exchange 919 addresses and public cloud 902 routes. PNAT device(s) 922 may include one or more dedicated PNAT applications, one or more virtual machines executing on real server(s) and configured to apply PNAT using network function virtualization (NFV), one or more service cards configured to apply the PNAT service.

The PNAT service implemented with PNAT device 922 may be associated with an address pool that is configured with routes for the cloud exchange 919 autonomous system and from which PNAT device 922 may draw to automatically provision and map, for PNAT purposes, to public cloud 902 and/or cloud service provider 920 routes received via peering sessions 912 and 916, respectively. The network addresses for configured routes in the address pool may be public, private, or a combination thereof, and may represent IPv4 and/or IPv6 routes. In some examples, the network addresses are public in order to provide global uniqueness for the network addresses.

Address mappings 924 may specify one or more PNAT mappings that associate routes from an address pool for cloud exchange 919 with routes received by cloud customer VRF 910, CSP VRF 914 from any of edges 906, 918, respectively. Routes received from any of edges 906, 918 (via eBGP connections 912, 916, respectively) for translation and used in end-to-end service delivery may include any IP addresses/prefixes from public cloud customers of the cloud exchange provider, such addresses including private and/or public IPv4 and/or IPv6 addresses and received at any one or more of the cloud exchange points managed by the cloud exchange provider.

As noted above, PNAT device 922 may perform PNAT to translate public cloud routes for public cloud 902 and cloud exchange 919 routes advertised to edge 918 for cloud service access. As a result, CSP 920 receives the cloud exchange 919 routes drawn from address pool 924 instead of the public cloud routes. Cloud exchange 919 is thus able to filter public cloud 902 information from CSP 920, and CSP 920 receives cloud exchange 919 routes associated with a single autonomous system (i.e., the cloud exchange 919 and one ASN per cloud client VRF) rather than customer routes (which could potentially number in the millions) associated with multiple different autonomous systems (and corresponding ASNs, which could potentially number in the hundreds) for various public cloud customers.

Further, because the cloud exchange 919 does not advertise its routes other than to public cloud 902 and CSP 920, cloud exchange 919 does not announce its routes to the Internet, which may improve security and reduce the potential for Denial of Service (DoS) or other malicious activity directed to cloud exchange 919 and public cloud 902/CSP 920 with which the cloud exchange 919 has peering relationships. In addition, the techniques described above may simplify end-to-end cloud service delivery processing and improve performance by ensuring that local traffic is processed locally (within the cloud exchange).

PNAT device 922 may forward and apply the PNAT service to downstream service traffic from edge 918, intended for public cloud 902, as follows. CSP VRF 914 receives a service packet via eBGP connection 916. The packet has a destination address that is a cloud exchange 919 address drawn from an address pool. VRF 914 stores a route for the destination address that specifies an address for the PNAT device 922, and VRF 914 tunnels the packet to PNAT device 922 for application of the PNAT service. PNAT device 922 uses address mappings 924 dynamically provisioned for routes for public cloud 902 and received from cloud client VRF 910 to perform PNAT and replace the service packet destination address with a destination address in public cloud 902. PNAT device 922 may tunnel the modified service packet to cloud client VRF 910. Cloud client VRF 910 forwards the modified service packet to edge 906 via eBGP connection 912. In this way, cloud exchange 919 provides a PNAT service to the public cloud to separate the public cloud from the cloud service layer. In a similar way, the cloud exchange 919 may apply PNAT to upstream traffic to separate cloud service providers from the public cloud access layer by which cloud customer tenants access the cloud exchange.

Figure 10:
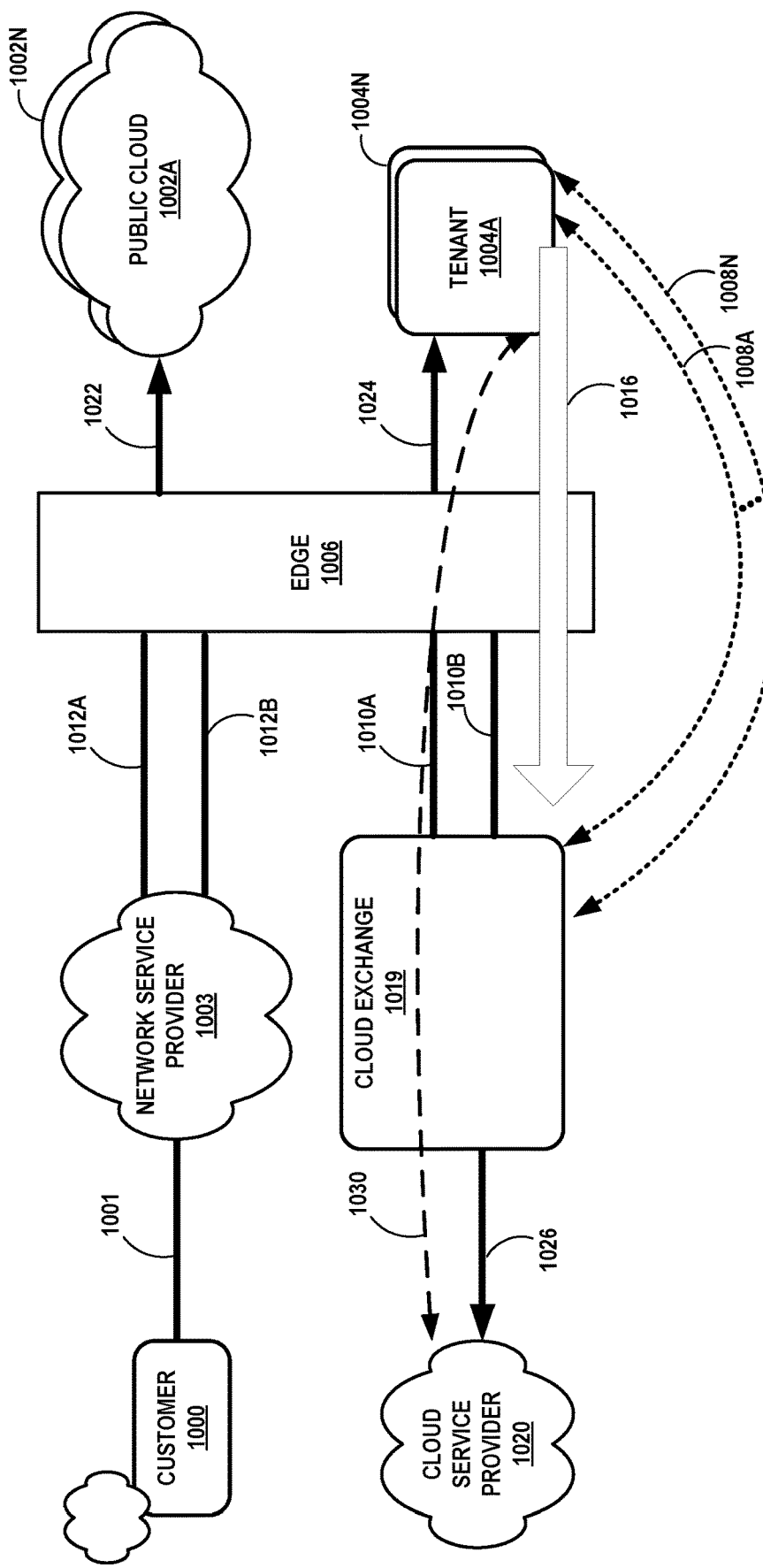

FIG. 10 is a block diagram illustrating another example use case in accordance with one or more aspects of the techniques of this disclosure. In this example, customer 1000 may receive cloud-based services from one or more public clouds 1002A-1002N (collectively, "public clouds 1002") indirectly via network service provider (NSP) 1003. NSP 1003 may establish peering connections 1012A and 1012B (collectively, "peering connections 1012," via external BGP (eBGP) or other exterior gateway routing protocol, with edge 1006 and offer indirect layer 3 connectivity and peering to customer 1000, via link 1001, for cloud services from one or more public clouds 1002. While this example includes two peering connections 1012 for redundancy, in other examples fewer or more peering connections may be configured between an NSP and an edge device. In addition, L3 connections over links 1022 may be used to interconnect edge 1006 to public clouds 1002.

Each of customer tenants 1004A-1004N (e.g., customer tenants 1004) represents a sub-network of one or more public clouds 1002 that is allocated for customers (e.g., customer 1000). While customer tenants 1004 are illustrated separately from public clouds 1002, customer tenants 1004 may be contained within the corresponding public clouds 1002.

Cloud-to-cloud interface 1016 may enable customers tenants 1004 to directly connect to cloud service provides 1020. In this way, cloud service traffic from any of customer tenants 1004 need not be routed through customer 100 and/or NSP 1003. Instead, cloud-to-cloud interface 1016 may route and forward cloud service traffic from any of customer tenants 1004 to CSP 1020, and vice versa.

As described above with reference to FIG. 6, customer tenants 1004A-N may each operate separate peering connections, via eBGP or other exterior gateway routing protocol, 1008A-1008N (collectively, "peering connections 1008"), respectively, with cloud exchange 1019 to exchange routes with cloud exchange 1019. In some examples, each of cloud tenants 1004 operates two or more peering connections 1008 for redundancy. Cloud exchange 1019 similarly operates a peering connection over link 1026 with CSP 1020 to exchange routes with CSP 1020. In some examples, customer tenants 1004 may use a transport layer security (TLS) protocol 1030 for secure communications and data transmissions between tenant applications of customer tenants 1004 and cloud service provider 1020. In other examples, a secure sockets layer (SSL) protocol may be used for secure communications and data transmissions between tenant applications and cloud service provider 1020.

Figure 11:
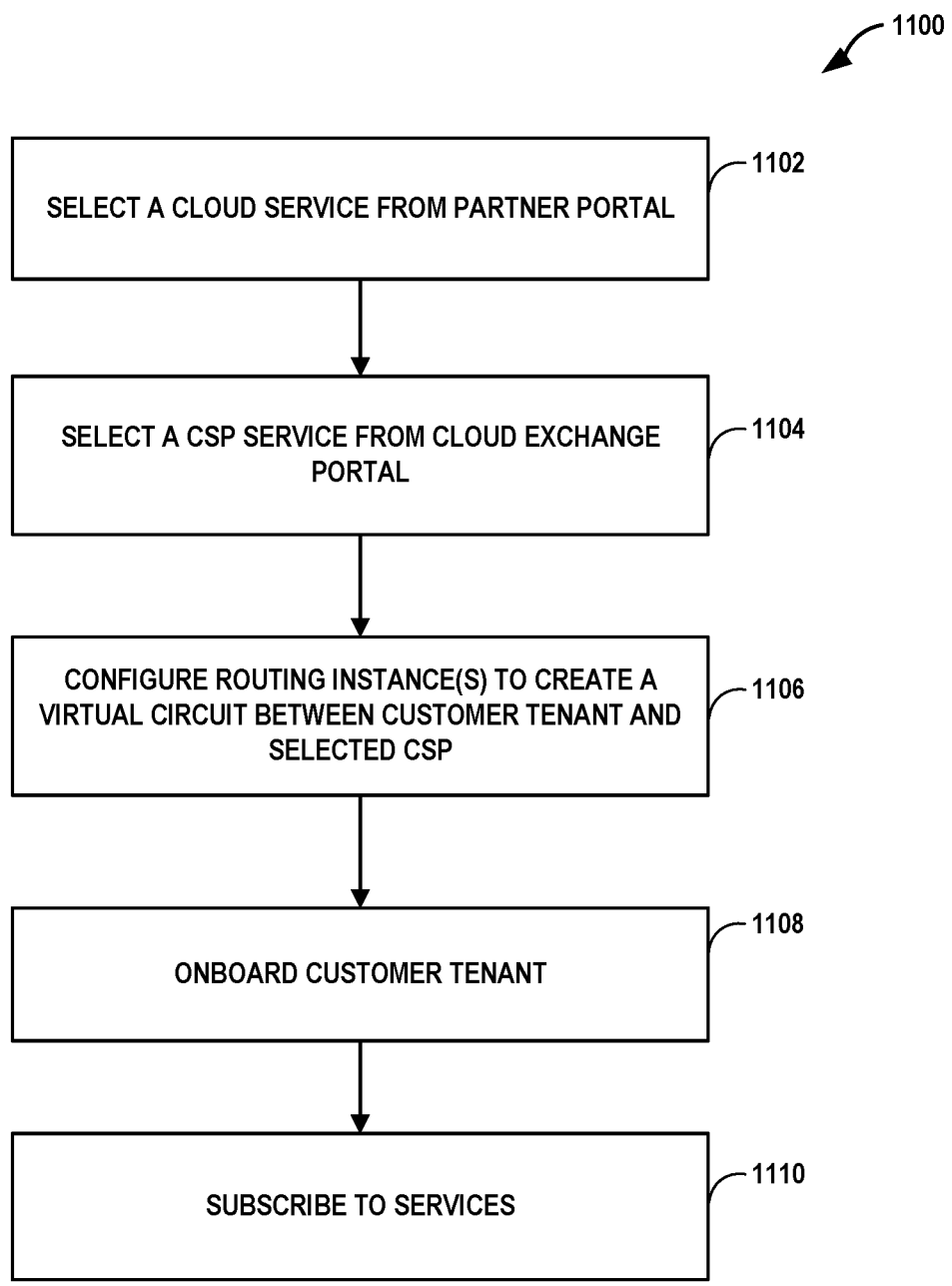
FIG. 11 is a flowchart illustrating an example process for configuring a cloud exchange according to techniques described in this disclosure.

FIG. 11 is a flowchart 1100 illustrating an example process for configuring a cloud exchange according to techniques described in this disclosure.

A customer selects a cloud service, e.g., services provided by a public cloud, from a partner portal (1102). In some examples, the partner portal is executed on a network service provider, server, or public cloud. In some examples, the selected cloud service may include content/media delivery, cloud-based storage, cloud computing, online gaming, IT, or any other cloud service offered by a public cloud. In response to selecting a cloud service, the partner portal establishes, a cloud exchange network, one or more virtual circuits from the customer to the public cloud offering the cloud service and provides a services key. For example, as shown in FIG. 3B, customer 308B may select services from CSP 320A and CSP 320 via a partner portal (e.g., corresponding to CSP 329A). In response to selecting CSP 320A and 320B, the partner portal, e.g., through programmable network platform 120, may establish layer 3 virtual circuits 330A and 330B to interconnect customer network 308B and CSPs 320A, 320B with end-to-end IP paths (e.g., as described above with reference to FIG. 3B). The public cloud may allocate a sub-network (a customer tenancy) for the customer (e.g., as shown by customer tenant networks 604 within public cloud 602 of FIG. 6). In some examples, two service keys are needed for non-colocation customers. For example, the partner portal may provide one key for local access and another key for remote service subscription.

The customer selects a cloud service provider (CSP) service from a customer portal for the cloud exchange to integrate that CSP service into cloud tenant applications (1104). In response to selecting a CSP service, ASN numbers and customer IP addresses are connected (e.g., for cloud exchange points, customer networks, customer tenants, NSPs, and/or CSPs as described above with reference to FIG. 5). The cloud exchange configures routing instances to create a virtual circuit between the customer tenant and the selected CSP (1106). For example, as shown in FIG. 6, to create an end-to-end IP paths between customer tenant 604A and CSP 320A, cloud exchange 303 may provision cloud customer VRF 612A corresponding to customer tenant 604A and a first CSP VRF 402B corresponding to selected CSP 320A and establish layer 3 virtual circuit 630A. Establishing the virtual circuit 630A may include configuring the VRFs to import each other's routes. In some examples, cloud customer VRF 612A and/or first CSP VRF 402B may be public or private routing instances according to the service subscribed to from CSP 320A. In some examples, virtual circuit 630A will be terminated within cloud customer VRF 612A and CSP VRF 402B.

Cloud exchange next onboards customer tenant (1108). For example, as shown in FIG. 6, cloud exchange 303 may establish peering connection 608A (e.g., eBGP) between cloud customer VRF 612A and customer tenant 604A to exchange routes with customer tenant 604A. In another example, as shown in FIG. 7, cloud change 303 may establish peering connection 708 between cloud customer VRF 710 and router 703 of public cloud 703. In some examples, the access link between the customer tenant/public cloud and the cloud exchange may be configured to operate as a VLAN. The cloud exchange then subscribes the cloud services to the customer tenant (1110). For example, as shown in FIG. 6, cloud exchange 303 may establish peering connection 406B between CSP VRF 402B and PE 312A, corresponding to CSP 320A. In this way, the cloud customer VRF (e.g., VRF 612A) may exchange, via a first customer peering session (e.g., peering session 608A), first route information with a router of a first tenant of a first public cloud (e.g., customer tenant 604A of public cloud 602 in FIG. 6), the CSP VRF (e.g., VRF 402B) may exchange, via a CSP peering session (e.g., peering session 406B), second route information with a CSP (e.g., CSP 320A), and exchanges the first route information and the second route information between the cloud customer VRF and the CSP VRF. In some examples, the cloud exchange may be configured to apply a network address translation and to route and forward cloud service traffic from a public cloud tenant to and from a cloud service provider (e.g., as described above with reference to FIG. 9). Once the cloud services are subscribed to the customer tenant, the cloud exchange may receive, from the customer tenant of the public cloud, service traffic for the CSP and forward, using the cloud customer VRF and the CSP VRF, the service traffic to the CSP based on at least one of the first route information or the second route information.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

What is claimed is:

1. A cloud exchange comprising:
a network configured with:
a first cloud customer virtual routing and forwarding instance (VRF); and
a first cloud service provider (CSP) VRF; and
a first cloud-to-cloud interface comprising a virtual layer 2 connection between the network and a router of a first tenant of a public cloud, wherein the virtual layer 2 connection operates over an access link connecting the network and an edge router of the public cloud, and wherein the virtual layer 2 connection terminates in the first cloud customer VRF,
wherein the network is configured to use the first cloud-to-cloud interface to exchange, via a first customer peering session, first route information with the router of the first tenant of the public cloud,
wherein the network is configured to use the first CSP VRF to exchange, via a first CSP peering session, second route information with a first CSP,
wherein the network is configured to exchange the first route information and the second route information between the first cloud customer VRF and the first CSP VRF, and
wherein the network receives, from the first tenant of the public cloud, service traffic for the first CSP and forwards, using the first cloud customer VRF and the first CSP VRF, the service traffic to the first CSP based on at least one of the first route information or the second route information.

2. The cloud exchange of claim 1,
the network further configured with:
a second cloud customer VRF, and
a second CSP VRF; and
a second cloud-to-cloud interface comprising a virtual layer 2 connection between the network and a router of a second tenant of a public cloud, wherein the virtual layer 2 connection for the second cloud-to-cloud interface operates over the access link connecting the network and the edge router of the public cloud, and wherein the virtual layer 2 connection for the second cloud-to-cloud interface terminates in the second cloud customer VRF,
wherein the network is configured to use the second cloud-to-cloud interface to exchange, via a second customer peering session, third route information with the router of the second tenant of the public cloud,
wherein the network is configured to use the second CSP VRF to exchange, via a second CSP peering session, fourth route information with a second CSP,
wherein the network is configured to exchange the third route information and the fourth route information between the second cloud customer VRF and the second CSP VRF, and
wherein the network receives, from the second tenant of the public cloud, service traffic for the second CSP and forwards, using the second cloud customer VRF and the second CSP VRF, the service traffic to the second CSP based on at least one of the third route information or the fourth route information.

3. The cloud exchange of claim 1,
wherein the network is further configured with a second cloud customer VRF;
wherein the network is configured to use the second cloud customer VRF to exchange, via a second customer peering session, third route information with a router of a second tenant of the public cloud,
wherein the network is configured to exchange the third route information and the second route information between the second cloud customer VRF and the first CSP VRF, and
wherein the network receives, from the second tenant of the public cloud, service traffic for the first CSP and forwards, using the second cloud customer VRF and the first CSP VRF, the service traffic to the first CSP based on at least one of the third route information or the second route information.

4. The cloud exchange of claim 3, wherein the first customer peering session and the second customer peering session are different.

5. The cloud exchange of claim 1, wherein the cloud exchange and the first CSP are co-located.

6. The cloud exchange of claim 1, wherein the public cloud offers at least one of Platform-as-a-Service, Infrastructure-as-a-Service, Software-as-a-Service, or Distributed Denial of Service-as-a-Service services.

7. The cloud exchange of claim 1, further comprising:
a customer portal configured to output a list of cloud services available via one or more CSPs connected to the cloud exchange,
wherein the customer portal is configured to receive user input from an agent associated with the first tenant of the public cloud, the user input indicating selection of a cloud service offered by a first CSP network connected to the cloud exchange via the first CSP VRF, and
wherein, in response to the user input, the first cloud customer VRF is configured to exchange the second route information with the first CSP VRF, the second route information comprising at least one route to the cloud service offered by the first CSP network.

8. The cloud exchange of claim 7, wherein the second route information comprises at least one route to the first tenant of the public cloud.

9. The cloud exchange of claim 1, wherein the network is further configured to apply a network address translation (NAT) service to translate private addresses for the first tenant of the public cloud.

10. A method comprising:
configuring a network with:
a first cloud customer virtual routing and forwarding instance (VRF), and
a first cloud service provider (CSP) VRF to exchange, via a first CSP peering session, second route information with a first CSP, and to exchange first route information and the second route information with the first cloud customer VRF;
configuring a first cloud-to-cloud interface including a virtual layer 2 connection between the network and a router of a first tenant of a public cloud, wherein the virtual layer 2 connection operates over an access link connecting the network and an edge router of the public cloud, and wherein the virtual layer 2 connection terminates in the first cloud customer VRF;
configuring the network to use the first cloud-to-cloud interface to exchange, via a first customer peering session, first route information with the router of the first tenant of the public cloud;
configuring the network to exchange the first route information and the second route information between the first cloud customer VRF and the first CSP VRF;
receiving, at the network, service traffic from the first tenant of the public cloud for the first CSP; and
forwarding, by the network using the first cloud customer VRF and the first CSP VRF, the service traffic to the first CSP based on at least one of the first route information or the second route information.

11. The method of claim 10, further comprising:
configuring the network with:
a second cloud customer VRF;
a second CSP VRF to exchange, via a second CSP peering session, fourth route information with a second CSP;
configuring a second cloud-to-cloud interface comprising a virtual layer 2 connection between the network and a router of a second tenant of a public cloud, wherein the virtual layer 2 connection for the second cloud-to-cloud interface operates over the access link connecting the network and the edge router of the public cloud, and wherein the virtual layer 2 connection for the second cloud-to-cloud interface terminates in the second cloud customer VRF,
configuring the network to use the second cloud-to-cloud interface to exchange, via a second customer peering session, third route information with the router of the second tenant of the public cloud,
configuring the network to exchange the third route information and the fourth route information between the second cloud customer VRF and the second CSP VRF, and
receiving, at the network, service traffic from the second tenant of the public cloud for the second CSP; and
forwarding, by the network using the second cloud customer VRF and the second CSP VRF, the service traffic to the second CSP based on at least one of the third route information or the fourth route information.

12. The method of claim 10, further comprising:
configuring the network with a second cloud customer VRF to exchange, via a second customer peering session, third route information with a router of a second tenant of the public cloud;
configuring the network to exchange the third route information and the second route information between the second cloud customer VRF and the first CSP VRF;
receiving, at the network, service traffic from the second tenant of the public cloud for the first CSP; and
forwarding, by the network using the second cloud customer VRF and the first CSP VRF, the service traffic to the first CSP based on at least one of the third route information or the second route information.

13. The method of claim 12, wherein the first customer peering session and the second customer peering session are different.

14. The method of claim 10, wherein the cloud exchange and the first CSP are co-located.

15. The method of claim 10, wherein the public cloud offers at least one of Platform-as-a-Service, Infrastructure-as-a-Service, Software-as-a-Service, or Distributed Denial of Service-as-a-Service services.

16. The method of claim 10, further comprising:
configuring a customer portal to:
output a list of cloud services available via one or more CSPs connected to the cloud exchange; and
receive user input from an agent associated with the first tenant of the public cloud, the user input indicating selection of a cloud service offered by a first CSP network connected to the cloud exchange via the first CSP VRF; and
in response to the user input, exchanging, by the first cloud customer VRF, the second route information with the first CSP VRF, the second route information comprising at least one route to the cloud service offered by the first CSP network.

17. The method of claim 16, wherein the second route information comprises at least one route to the first tenant of the public cloud.

18. The method of claim 10, further comprising configuring the network to apply a network address translation (NAT) service to translate private addresses for the first tenant of the public cloud.

19. A non-transitory computer readable storage medium comprising instructions that when executed cause one or more processors to:
configure a network with:
a first cloud customer virtual routing and forwarding instance (VRF); and
a first cloud service provider (CSP) VRF to exchange, via a first CSP peering session, second route information with a first CSP, and to exchange first route information and the second route information with the first cloud customer VRF;
configure a first cloud-to-cloud interface including a virtual layer 2 connection between the network and a router of a first tenant of a public cloud, wherein the virtual layer 2 connection operates over an access link connecting the network and an edge router of the public cloud, and wherein the virtual layer 2 connection terminates in the first cloud customer VRF;
configure the network to use the first cloud-to-cloud interface to exchange, via a first customer peering session, first route information with the router of the first tenant of the public cloud;
receive, at the network, service traffic from the first tenant of the public cloud for the first CSP; and
forward, by the network, using the first cloud customer VRF and the first CSP VRF, the service traffic to the first CSP based on at least one of the first route information or the second route information.

20. The non-transitory computer readable storage medium of claim 19, wherein the instructions further cause the one or more processors to:
configure the network with:
a second cloud customer VRF;
a second CSP VRF to exchange, via a second CSP peering session, fourth route information with a second CSP;
configure a second cloud-to-cloud interface comprising a virtual layer 2 connection between the network and a router of a second tenant of a public cloud, wherein the virtual layer 2 connection for the second cloud-to-cloud interface operates over the access link connecting the network and the edge router of the public cloud, and wherein the virtual layer 2 connection for the second cloud-to-cloud interface terminates in the second cloud customer VRF;
configure the network to use the second cloud-to-cloud interface to exchange, via a second customer peering session, third route information with the router of the second tenant of the public cloud;
configure the network to exchange the third route information and the fourth route information between the second cloud customer VRF and the second CSP VRF;
receive, at the network, service traffic from the second tenant of the public cloud for the second CSP; and
forward, by the network using the second cloud customer VRF and the second CSP VRF, the service traffic to the second CSP based on at least one of the third route information or the fourth route information.

* * * * *